United States Patent
Yoshida

(10) Patent No.: US 8,793,586 B2
(45) Date of Patent: Jul. 29, 2014

(54) INFORMATION PROCESSING APPARATUS, CONTROL METHOD OF THE INFORMATION PROCESSING APPARATUS, PROGRAM THEREOF AND STORAGE MEDIUM STORING THE PROGRAM

(75) Inventor: Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 12/864,873

(22) PCT Filed: Feb. 5, 2009

(86) PCT No.: PCT/JP2009/052358
§ 371 (c)(1),
(2), (4) Date: Jul. 27, 2010

(87) PCT Pub. No.: WO2009/104514
PCT Pub. Date: Aug. 27, 2009

(65) Prior Publication Data
US 2010/0333035 A1    Dec. 30, 2010

(30) Foreign Application Priority Data

Feb. 20, 2008  (JP) ................. 2008-039095

(51) Int. Cl.
*G06F 15/177* (2006.01)
*G06F 17/27* (2006.01)
*G06F 3/12* (2006.01)
*H04L 12/24* (2006.01)
*G06F 17/21* (2006.01)

(52) U.S. Cl.
CPC .............. *H04L 41/22* (2013.01); *G06F 17/212* (2013.01); *G06F 3/1296* (2013.01)
USPC .......... 715/735; 715/273; 715/276; 715/835; 358/1.13; 358/1.15

(58) Field of Classification Search
USPC ......... 715/273–277, 735, 835; 358/1.13, 1.15
See application file for complete search history.

(56) References Cited

U.S. PATENT DOCUMENTS

| | | | |
|---|---|---|---|
| 5,565,964 A | 10/1996 | Tashiro et al. | |
| 6,075,519 A * | 6/2000 | Okatani et al. | 345/173 |
| 7,016,740 B2 * | 3/2006 | Nakamura et al. | 700/19 |

(Continued)

FOREIGN PATENT DOCUMENTS

| | | |
|---|---|---|
| JP | 07085162 A | 3/1995 |
| JP | 2005-250752 A | 9/2005 |
| JP | 2007215078 A | 8/2007 |

OTHER PUBLICATIONS

Japanese Office Action dated Aug. 23, 2013 in corresponding Japanese Application No. 2008-039095.

*Primary Examiner* — Tadeese Hailu
(74) *Attorney, Agent, or Firm* — Fitzpatrick, Cella, Harper & Scinto

(57) ABSTRACT

This invention relates to an information processing apparatus being able to execute first and second functions and set the processing conditions of each function by using a user interface, and a control method of the information processing apparatus. In a case that either of the first and second functions is selected, an application common to both the first and second functions is launched, and a user interface window generated based on common data corresponding to the application is displayed. The processing conditions of the selected function can be set from the user interface window.

16 Claims, 26 Drawing Sheets

(56) References Cited

U.S. PATENT DOCUMENTS 7,619,765 B2 * 11/2009 Kimura et al. ............... 358/1.15
7,864,955 B2    1/2011 Uchikawa et al.
2005/0105135 A1 *  5/2005 Takahashi ................... 358/1.18
2005/0128521 A1 *  6/2005 Takahashi ................... 358/1.15
2007/0236728 A1 * 10/2007 Kobayashi et al. .......... 358/1.15
2008/0134179 A1 *  6/2008 Takahashi ................... 718/100

* cited by examiner

F I G. 3
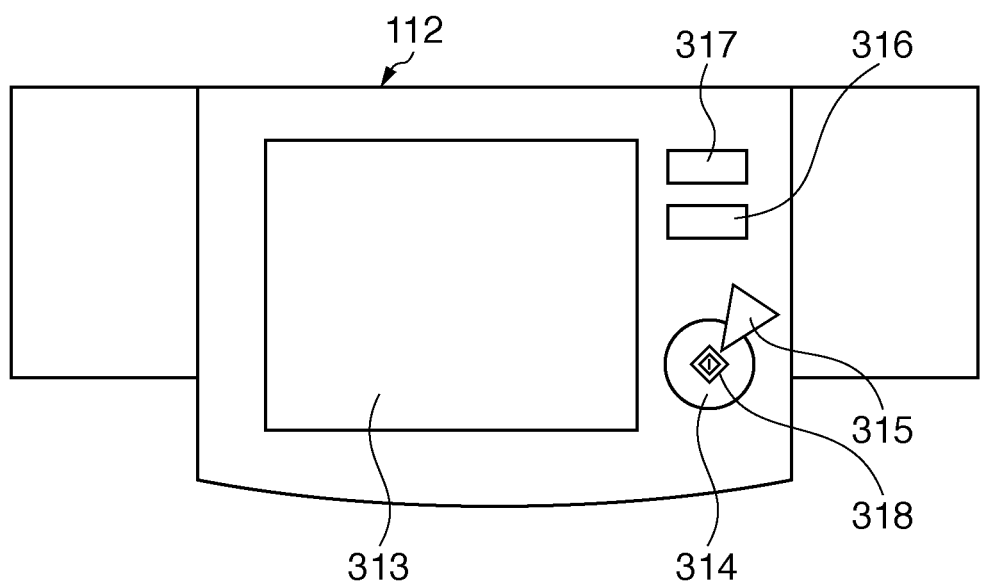

| PACKAGE | CATEGORY |
|---------|----------|
| A | A |
| B | B |
| C | C |

| APPLICATION | CATEGORY |
|-------------|----------|
| A | A, B |
| B | C |

| APPLICATION | CATEGORY |
|-------------|----------|
| A | A |
| B | C |

| PACKAGE | CATEGORY |
|---|---|
| MultiSEND | SEND |
| FAX | FAX |
| StoragePrint | PRINT DOCUMENT |
| MediaPrint | PRINT DOCUMENT IN MEDIUM |
| StorageSend | SEND DOCUMENT |
| Copy | COPY |

| APPLICATION | CATEGORY |
|---|---|
| MULTI PROTOCOL SEND | SEND, FAX |
| PRINT DOCUMENT IN STORAGE | PRINT DOCUMENT, PRINT DOCUMENT IN MEDIUM |
| SEND DOCUMENT IN STORAGE | SEND DOCUMENT |
| COPY | COPY |

INFORMATION PROCESSING APPARATUS, CONTROL METHOD OF THE INFORMATION PROCESSING APPARATUS, PROGRAM THEREOF AND STORAGE MEDIUM STORING THE PROGRAM

TECHNICAL FIELD

The present invention relates to an information processing apparatus which has an application for executing a plurality of types of functions and executes a function designated by the user, and a control method of the information processing apparatus. The information processing apparatus includes an image forming apparatus (e.g., a multi-function peripheral), a communication apparatus, an image input device (e.g., a PC or scanner), and an image capturing device (e.g., a camera).

BACKGROUND ART

The user interface of an apparatus having a plurality of functions, like a multi-function peripheral, displays an operation window (UI window) dedicated to each function. The user uses the displayed window to input various instructions and settings (see U.S. Pat. No. 5,565,964).

When setting even the same processing conditions in a conventional apparatus having a plurality of functions, the user must set the processing conditions for each function using an operation window dedicated to the function. For example, in a conventional multi-function peripheral having a copy function, FAX function, and box function, these functions commonly use a print function. More specifically, the copy function prints image data scanned by a scanner. The FAX function prints received facsimile data. The box function includes a box print function of printing data stored in a box.

When the copy function uses the print function, print conditions are set using an operation window for setting print conditions dedicated to the copy function. When the box print function uses the print function, print conditions are set using an operation window for setting print conditions dedicated to the box function. However, print functions for the copy function and box print function include the same setting items. For example, the setting items of the size and type of print paper, the setting item of the number of copies, and the like are print conditions which can be set commonly between the respective print functions. Conventionally, however, these print conditions must be set in operation windows unique to the respective functions. Every time the function to be executed is switched, the same processing conditions need to be set again. A demand has arisen for a more efficient processing condition setting method.

DISCLOSURE OF INVENTION

An aspect of the present invention is to eliminate the above-mentioned problems with the conventional technology.

According to an aspect of the present invention, there can be provided a technique of allowing a plurality of functions to use a common user interface window, and permitting or inhibiting predetermined processing in the user interface window in accordance with a designated function.

According to another aspect of the present invention, there can be provided a technique of allowing a plurality of functions to use a common user interface window, and changing the transition of a window display subsequent to the user interface window in accordance with a designated function, thereby more efficiently setting processing conditions.

According to an aspect of the present invention, there is provided an information processing apparatus being capable of executing first and second functions and setting a processing condition of each function by using a user interface, the apparatus comprises: a selection unit configured to select any one of the first and second functions; a display control unit configured to, in a case that the selection unit selects any one of the first and second functions, launch an application common to both the first and second functions and display a user interface window generated based on common data corresponding to the application; and a setting unit configured to set a processing condition of the function selected by the selection unit, using the user interface window, wherein the display control unit switches, in accordance with which of the first and second functions is selected by the selection unit, whether to display a user interface window capable of designating specific processing.

According to another aspect of the present invention, there is provided an information processing apparatus being capable of executing first and second functions and setting a processing condition of each function by using a user interface, the apparatus comprises: a selection unit configured to select any one of the first and second functions; a display control unit configured to, in a case that the selection unit selects any one of the first and second functions, launch an application common to both the first and second functions and display a user interface window generated based on common data corresponding to the application; and a setting unit configured to set a processing condition of the function selected by the selection unit, using the user interface window, wherein the display control unit switches, in accordance with which of the first and second functions is selected by the selection unit, contents of a window displayed after transition from the user interface window.

According to another aspect of the present invention, there is provided a control method of an information processing apparatus being capable of executing first and second functions and setting a processing condition of each function by using a user interface, the method comprises: a selection step of selecting any one of the first and second functions; a display control step of, in a case that any one of the first and second functions is selected in the selection step, launching an application common to both the first and second functions and displaying a user interface window generated based on common data corresponding to the application; and a setting step of setting a processing condition of the function selected in the selection step, using the user interface window, wherein in the display control step, whether to display a user interface window capable of designating specific processing is switched in accordance with which of the first and second functions is selected in the selection step.

According to another aspect of the present invention, there is provided a control method of an information processing apparatus being capable of executing first and second functions and setting a processing condition of each function by using a user interface, the method comprises: a selection step of selecting any one of the first and second functions; a display control step of, in a case that any one of the first and second functions is selected in the selection step, launching an application common to both the first and second functions and displaying a user interface window generated based on common data corresponding to the application; and a setting step of setting a processing condition of the function selected in the selection step, using the user interface window, wherein in the display control step, contents of a window displayed after transition from the user interface window are switched in accordance with which of the first and second functions is selected in the selection step.

Further features and aspects of the present invention will become apparent from the following description of exemplary embodiments, with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 3 depicts a plan view showing the arrangement of a console unit of the MFP according to the embodiment;

FIG. 6 depicts a view illustrating an example of a table describing the association between the package and the category in an association table "package with category" in FIG. 5;

FIG. 7 depicts a view illustrating an example of a table describing the association between the application and the category in an association table "application with category" in FIG. 5;

FIG. 8 depicts a view illustrating an example of a table describing an example of changing the association table "application with category" in FIG. 7;

FIG. 11 depicts a view illustrating an example of a table showing the structure of the association table "package with category" which stores the association between each package and each category in FIG. 4;

FIG. 12 depicts a view illustrating an example of a table showing the structure of a table which stores the association between the application and the category in the MFP according to the first embodiment;

BEST MODE FOR CARRYING OUT THE INVENTION

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

<Basic Description of MFP>

Figure 1:
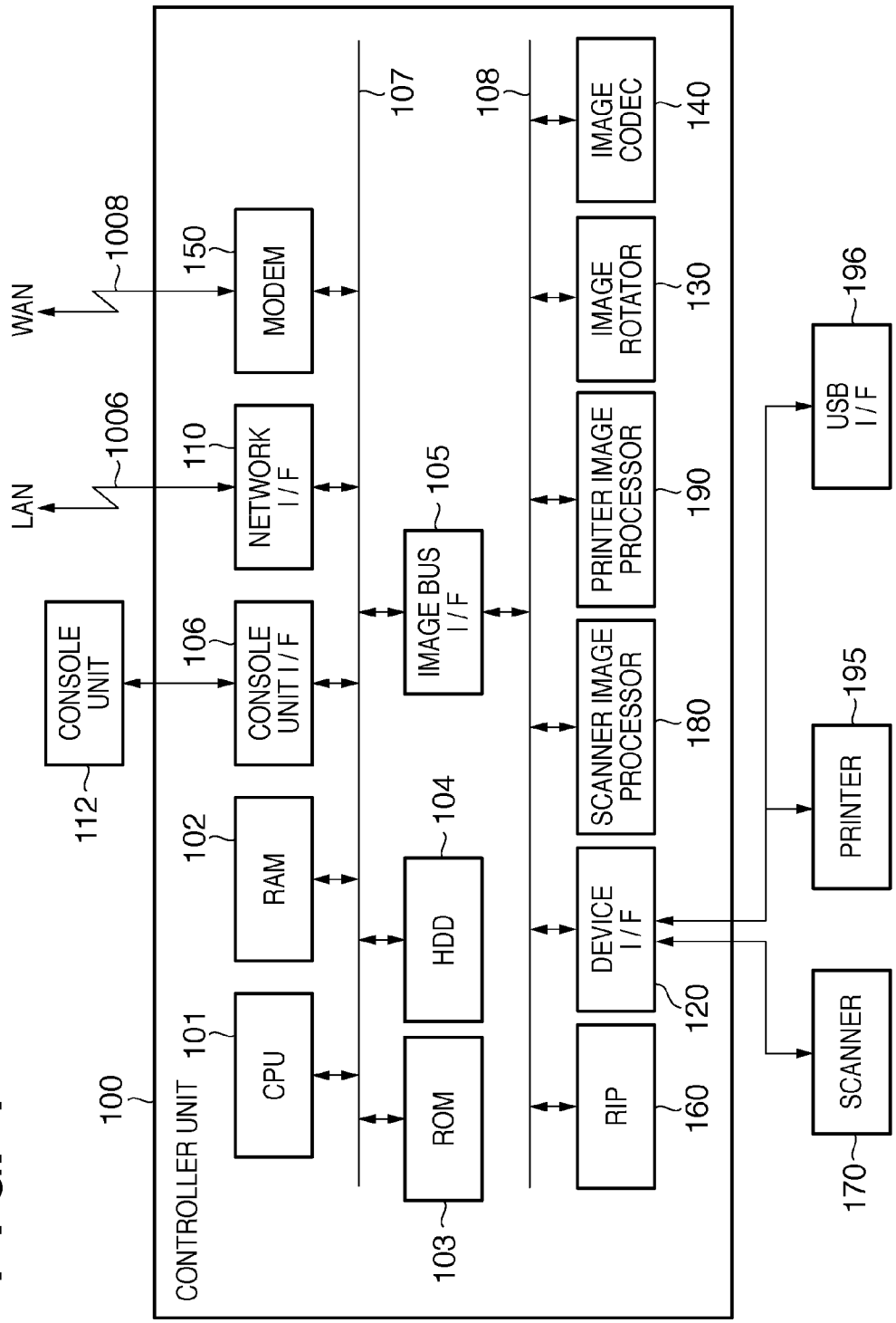
FIG. 1 is a block diagram showing the arrangement of the main part of an MFP (multi-function peripheral) according to an exemplary embodiment.

FIG. 1 is a block diagram showing the arrangement of the main part of an MFP (multi-function peripheral) according to the exemplary embodiment.

The MFP includes a controller unit 100. A scanner 170 serving as an image input device, and a printer 195 serving as an image output device are connected to the controller unit 100. A console unit 112 is also connected to the controller unit 100. The controller unit 100 performs control to implement a copy function of causing the printer 195 to print an image based on image data scanned by the scanner 170. By connecting the controller unit 100 to a LAN 1006 or public line 1008 (WAN), the controller unit 100 performs control to input/output image information and device information.

More specifically, the controller unit 100 comprises a CPU 101. The CPU 101 launches an operating system (OS) in accordance with a boot program stored in a ROM 103. On the OS, an application program stored in an HDD (Hard Disk Drive) 104 is loaded into a RAM 102 and executed to perform a variety of processes. The RAM 102 is used as the work area of the CPU 101. The RAM 102 stores programs, and also provides a work area and an image memory area for temporarily storing image data. The application program and the like are installed in the HDD 104. The HDD 104 is also used to store image data and the like.

Together with the ROM 103 and RAM 102, a console unit I/F 106, network I/F 110, modem 150, and image bus I/F 105 are connected to the CPU 101 via a system bus 107.

The console unit I/F 106 is an interface with the console unit 112 having a touch panel. The console unit I/F 106 outputs, to the console unit 112, image data to be displayed on the console unit 112. The console unit I/F 106 sends, to the CPU 101, information input by a key operation by the user on the console unit 112 or a touch on the touch panel.

The network I/F 110 is connected to the LAN 1006, and inputs/outputs information via the LAN 1006 from/to each device on the LAN 1006. The modem 150 is connected to the public line 1008, and inputs/outputs information via the public line 1008.

The image bus I/F 105 is a bus bridge which connects the system bus 107 to an image bus 108 for transferring image data at high speed, and converts the data format. The image bus 108 is formed using a PCI bus or IEEE1394 bus. A raster image processor (to be referred to as a RIP hereinafter) 160, device I/F 120, scanner image processor 180, printer image processor 190, image rotator 130, and image codec 140 are arranged on the image bus 108. The RIP 160 rasterizes a PDL code into bitmap image data. The device I/F 120 is connected to the scanner 170 and printer 195, and executes synchronous/asynchronous conversion of image data. The scanner image processor 180 performs correction, modification, and editing for input image data. The printer image processor 190 performs correction, resolution conversion, and the like corresponding to the printer 195 for print image data. The image rotator 130 rotates image data. The image codec 140 compresses multilevel image data into JPEG data, and binary image data into JBIG, MMR, or MH data or the like. Further, the image codec 140 decompresses compressed image data. A USB I/F 196 communicates with a USB memory (not shown) connected to the USB connector of the MFP. Image data which is scanned by the scanner 170 and undergoes predetermined processing by the scanner image processor 180 is stored via the USB I/F 196 in a USB memory connected to the MFP. The USB I/F 196 reads out image data stored in the USB memory, and converts it into image data printable by the printer image processor 190 so that the printer 195 can print the image data.

The hardware configurations of the scanner 170 and printer 195 will be explained with reference to FIG. 2.

Figure 2:
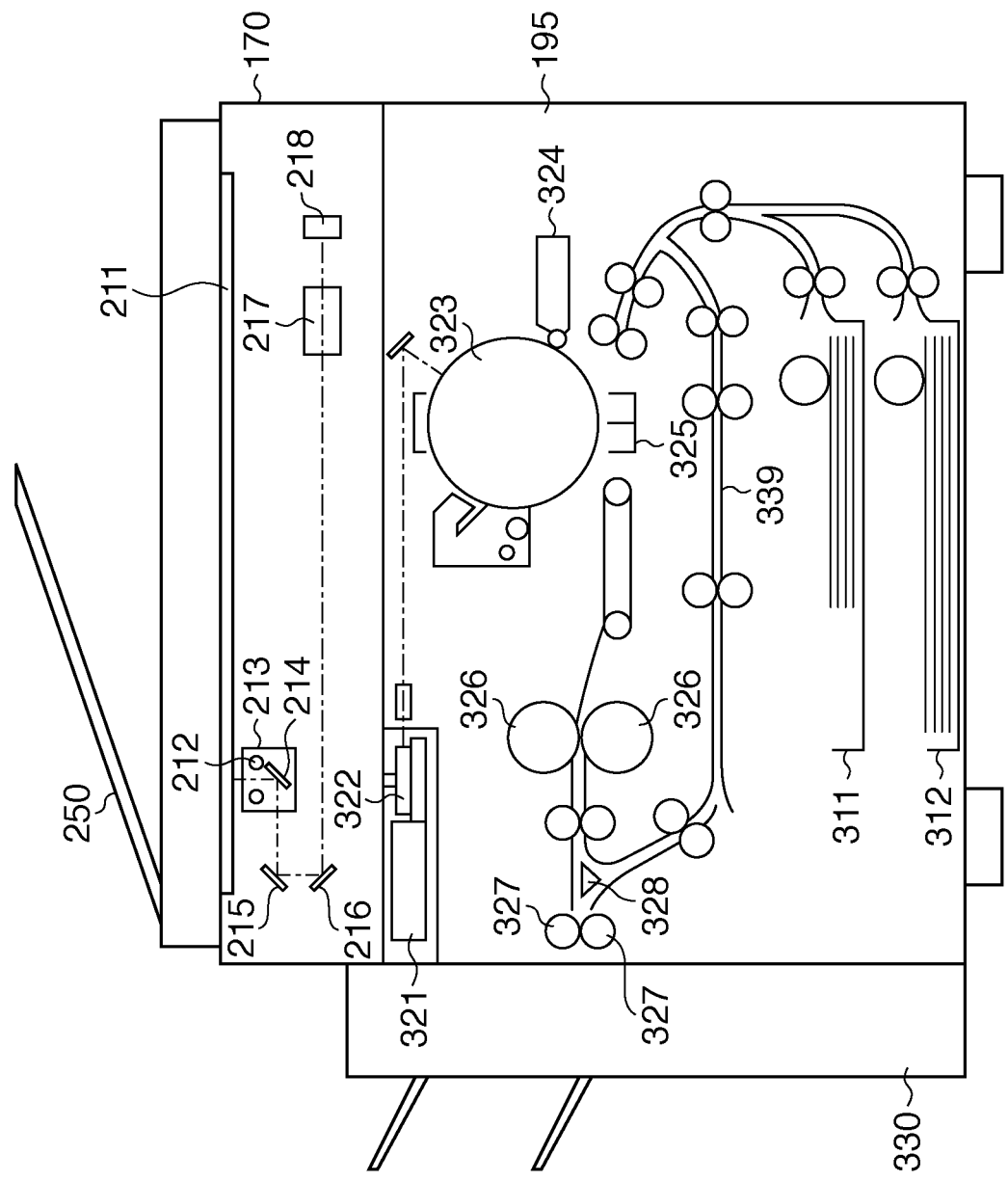
FIG. 2 depicts a side sectional view showing the hardware configuration of the MFP according to the embodiment.

FIG. 2 depicts a side sectional view showing the hardware configuration of the MFP according to the exemplary embodiment.

As shown in FIG. 2, the scanner 170 and printer 195 are integrated. The scanner 170 includes a document feed unit 250. The document feed unit 250 feeds document sheets one by one sequentially from the top onto a platen glass 211. Every time each document sheet is scanned, it is discharged from the platen glass 211 onto a discharge tray (not shown). When a document sheet is fed onto the platen glass 211, the scanner 170 turns on a lamp 212 to start moving a moving unit 213. As the moving unit 213 moves, the document sheet on the platen glass 211 is read and scanned. During the read scanning, reflected light from the document sheet is guided to a CCD image sensor (to be referred to as a CCD hereinafter) 218 via mirrors 214, 215, and 216 and a lens 217, forming an image on the document sheet onto the image sensing surface of the CCD 218. The CCD 218 converts the image formed on the image sensing surface into an electrical signal. The electrical signal undergoes predetermined processing, and is output to the image bus 108 of the controller unit 100 via the device I/F 120.

The printer 195 includes a laser driver 321. The laser driver 321 drives a laser emitting unit 322 on the basis of image data input from the controller unit 100. Then, the laser emitting unit 322 emits a laser beam corresponding to the image data. While scanned, the laser beam irradiates the surface of a photosensitive drum 323, forming an electrostatic latent image on the photosensitive drum 323. The electrostatic latent image is visualized as a toner image by toner supplied from a developer 324. In synchronism with the laser beam irradiation timing, a print sheet from a sheet cassette 311 or 312 is fed via a feeding path to between the photosensitive drum 323 and a transfer unit 325. The transfer unit 325 transfers the toner image on the photosensitive drum 323 onto the fed sheet.

The sheet bearing the toner image is sent by a conveying belt to a pair of fixing rollers (heating roller and pressing roller) 326. The pair of fixing rollers 326 press the sheet to fix the toner image on the sheet onto it by heat. The sheet having passed through the pair of fixing rollers 326 is discharged by a pair of discharge rollers 327 to a discharge unit 330. The discharge unit 330 is a sheet processing device capable of performing post processes such as sorting and stapling.

When the double-sided printing mode is set, the sheet bearing the fixed image is conveyed to the pair of discharge rollers 327. Then, the rotational direction of the pair of discharge rollers 327 is reversed to guide the sheet to a re-feeding path 339 by a flapper 328. The sheet is guided to the re-feeding path 339, and fed again to between the photosensitive drum 323 and the transfer unit 325 at the above-described timing, forming a toner image on the lower surface of the sheet.

FIG. 3 depicts a plan view illustrating the arrangement of the console unit 112 of the MFP according to the embodiment.

An LCD display 313 is formed by sticking a touch panel sheet onto an LCD. The LCD display 313 displays the operation window of the MFP, and when the user touches a key displayed on the window, notifies the CPU 101 of the position information. A start key 314 is used to start a document image reading operation or the like. An LED 318 in two, green and red is arranged at the center of the start key 314. The color of the LED 318 represents whether the start key 314 is available. A stop key 315 is operated to stop an operation in progress. An ID key 316 is used to input a user ID. A reset key 317 is used to initialize settings from the console unit 112.

<Description of Concept of Menu Window>

Figure 4:
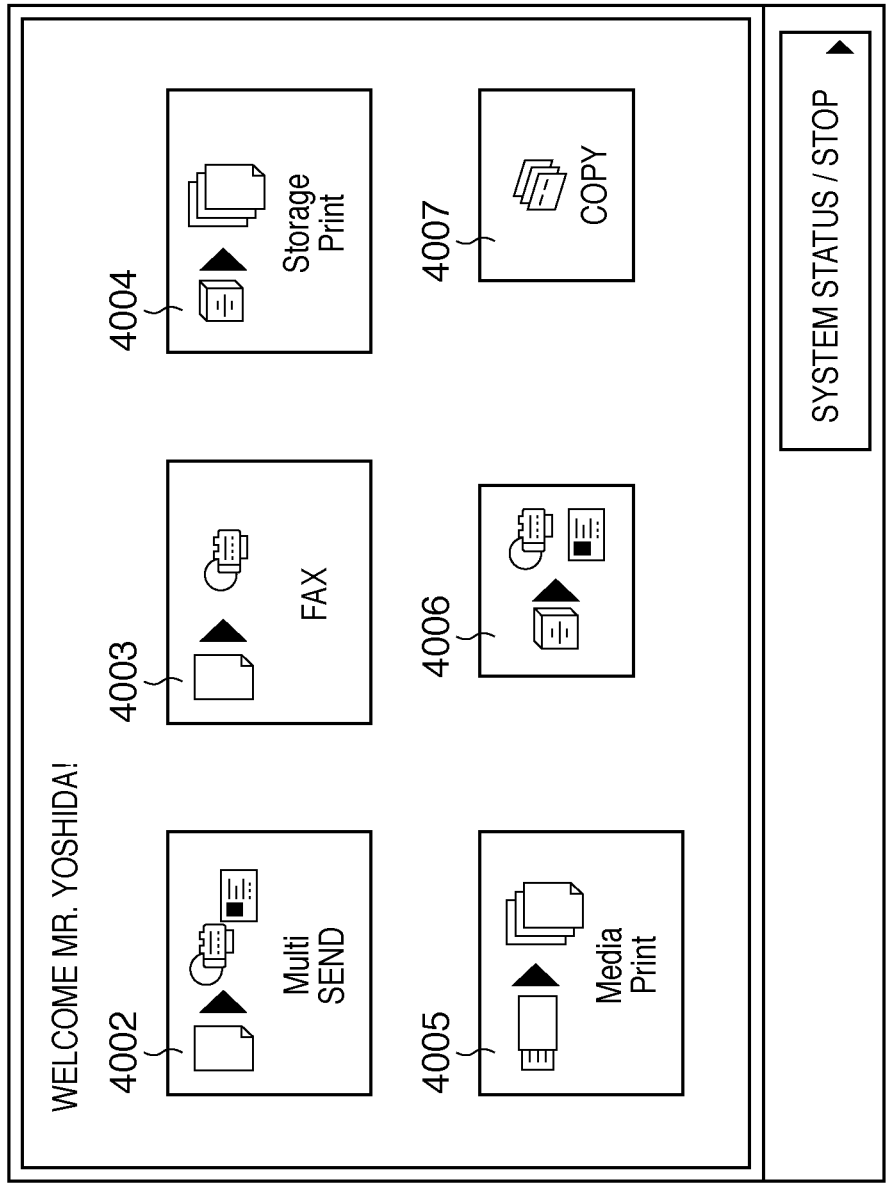
FIG. 4 depicts a view showing an example of a window (menu window) for selecting a function to be executed in the MFP according to the embodiment.

FIG. 4 depicts a view illustrating an example of a window (menu window) for selecting a function to be executed in the MFP according to the embodiment.

The menu window displays a list of icons representing functions executable in the MFP. By using this window, the user can designate a desired function. A function executable by the MFP will be called a package. Each package is displayed in accordance with a category set for an application which executes the function. Categories include, for example, "send", "FAX", "print document", "print document in medium", "send document", and "copy". "Send" is a data send function of sending data including mail to a destination. "Print document" is a function of reading out data stored in a box and printing it by the printer 195. "Print document in medium" is a function of reading out data stored in the above-mentioned USB memory or the like and printing it by the printer 195. "Send document" is a function of reading out data stored in a box and sending it via a network.

A Multi SEND button 4002 belongs to the category "send", and designates general data sending. A FAX button 4003 belongs to the category "FAX", and designates facsimile transmission. A Storage Print button 4004 belongs to the category "print document", and designates sending of document data stored in the HDD 104. A Media Print button 4005 belongs to the category "print document in medium", and designates printing of data stored in the USB memory connected to the USB I/F 196. A button 4006 belongs to the category "send document", and designates sending of data stored in a box. A button 4007 belongs to the category "copy", and designates copying.

Figure 5:
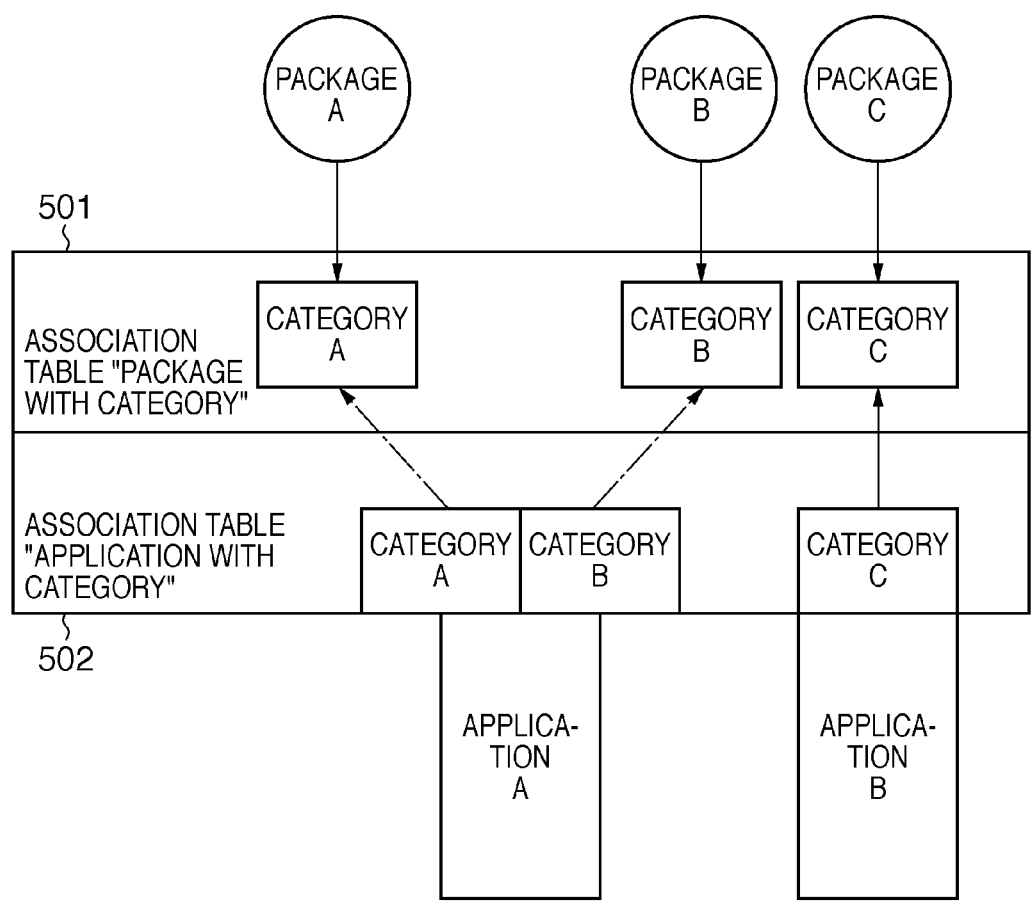
FIG. 5 depicts a view schematically showing the relationship between the package, the category, and the application in the MFP according to the embodiment.

FIG. 5 depicts a view schematically showing an example of the relationship between the package, the category, and the application in the MFP according to the embodiment.

FIG. 5 shows package A corresponding to category A, package B corresponding to category B, and package C corresponding to category C.

FIG. 6 depicts a view illustrating an example of a table describing the association between the package and the category in an association table "package with category" 501 in FIG. 5.

In FIG. 6, packages A, B, and C are associated with categories A, B, and C, respectively.

FIG. 7 depicts a view illustrating an example of a table showing an example of the association between the application and the category in an association table "application with category" 502 in FIG. 5.

In the embodiment, a category and package are in on-to-one correspondence, as shown in FIG. 6. To the contrary, an application can be associated with a plurality of categories, as shown in FIG. 7.

Assume that the user selects package A in FIG. 5 in the menu window of FIG. 4. Upon detecting this selection, the controller unit 100 looks up the association table "package with category" 501 to obtain a category associated with package A. In this case, package A is associated with category A. The controller unit 100 searches the association table "application with category" 502 for an application having category A to recognize that the associated application is application A. Then, the controller unit 100 launches application A.

Similarly, assume that the user selects package B in the menu window of FIG. 4. Upon detecting this selection, the controller unit 100 looks up the association table "package with category" 501 to recognize that package B is associated with category B. The controller unit 100 searches the association table "application with category" 502 for an application having category B to recognize that the associated application is application A. Then, the controller unit 100 launches application A.

Assume that the user selects package C in the menu window. Upon detecting this selection, the controller unit 100 looks up the association table "package with category" 501 to recognize that package C is associated with category C. The controller unit 100 searches the association table "application with category" 502 to recognize that the application having category C is application B. Then, the controller unit 100 launches application B.

<Editing of Category of Application>

The association table "application with category" 502 in FIG. 7 can be edited. For example, when the association table "application with category" 502 is edited and changed as shown in FIG. 8, the schematic view showing the relationship between the package, the category, and the application changes to FIG. 9. When changing the category, for example, the display 313 displays an editing window showing a list of applications and categories. The user changes the association between the application and the category on the window. In this way, the association between the application and the category may also be changed.

FIG. 8 depicts a view illustrating a table describing an example of changing the association table "application with category" 502 in FIG. 7. In FIG. 8, application A is changed to be associated with only category A.

Figure 9:
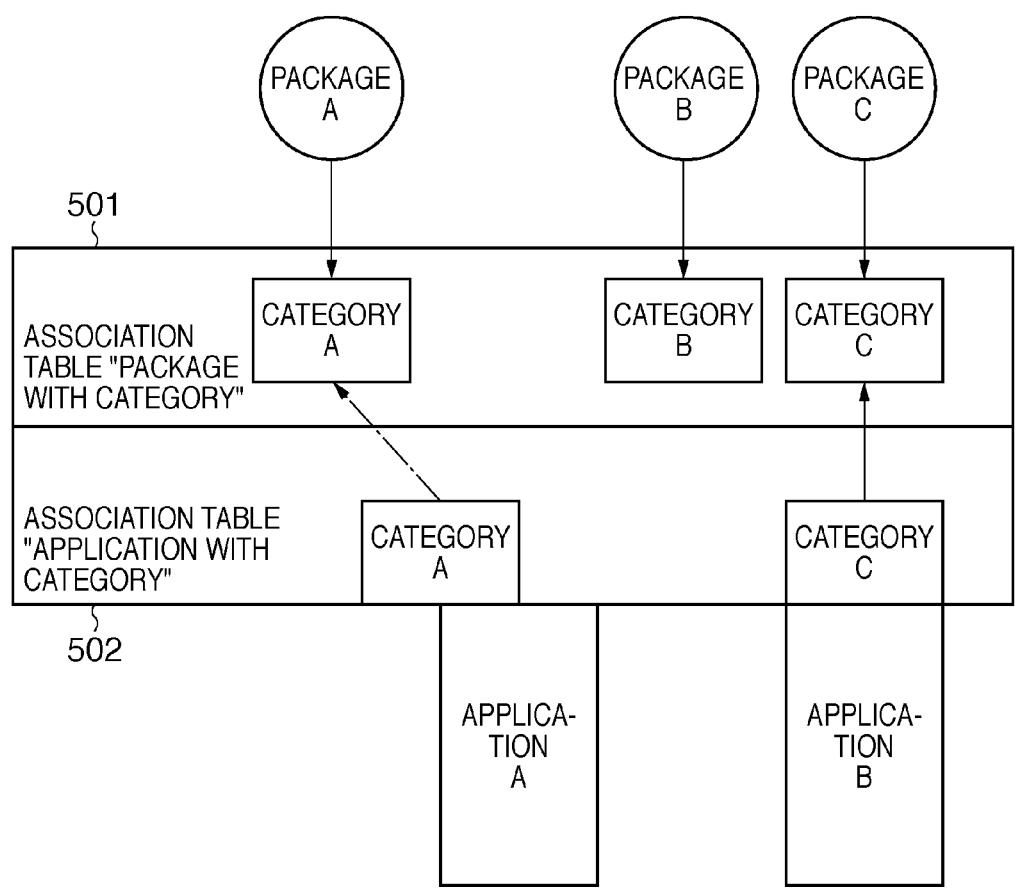
FIG. 9 depicts a view schematically showing the relationship between the package, the category, and the application that corresponds to the example of change shown in FIG. 8 in the MFP according to the embodiment.

FIG. 9 depicts a view schematically illustrating an example of the relationship between the package, the category, and the application that corresponds to the example of change shown in FIG. 8 in the MFP according to the embodiment.

In FIG. 8, application A is changed to be associated with only category A. Thus, the association between application A and package B in FIG. 5 disappears in FIG. 9.

In this state, for example, when the user selects package B in the menu window (FIG. 4), the controller unit 100 detects this operation. Then, the controller unit 100 looks up the association table "package with category" 501 to obtain a category associated with package B. In this case, the controller unit 100 obtains category B. The controller unit 100 searches the association table "application with category" 502 for an application having category B. However, in the example of FIGS. 8 and 9, there is no application associated with category B. Thus, the controller unit 100 displays an error on the display 313 to represent that there is no associated application.

Upon starting-up or detecting that configuration information of the MFP has changed, the controller unit 100 looks up the association table "application with category" 502 to determine whether or not all categories are associated with applications. For example, in FIG. 9, category B is not associated with any application, so the icon (selection button) of package B associated with category B may also be hidden. By hiding a package with which no application is associated, the above-mentioned situation in which an error is displayed can be prevented.

<Description of Concept of Operation>

Figure 10:
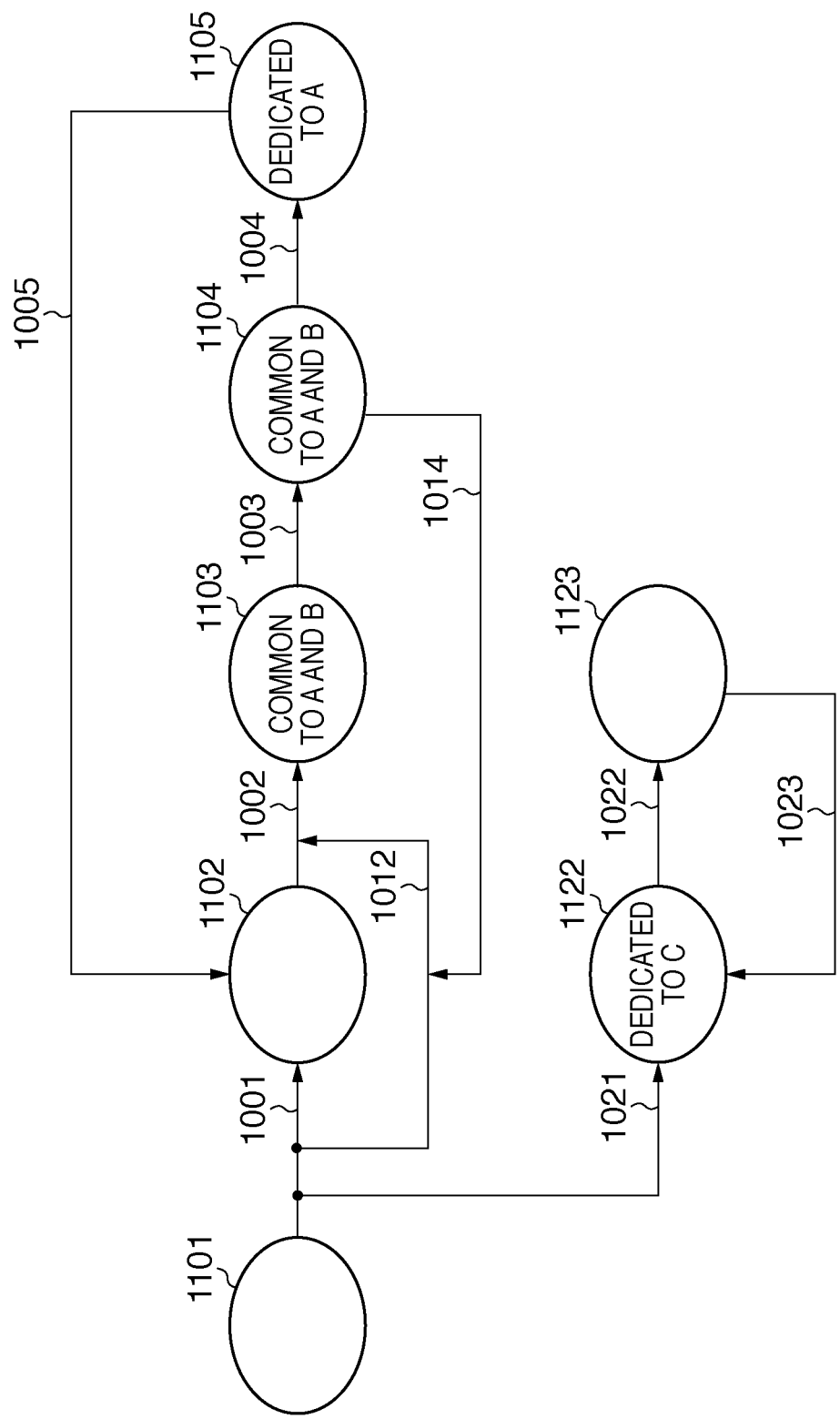
FIG. 10 depicts a view illustrating an example of the transition of an operation window in the MFP according to the first embodiment of the present invention.

FIG. 10 depicts a view for conceptually explaining the above-described operation according to the first embodiment as the transition of an operation window.

FIG. 10 depicts a view illustrating an example of the transition of an operation window in the MFP according to the first embodiment.

In FIG. 10, each circle represents a logical display window, and in an actual example, may correspond to a plurality of types of window displays or menus (to be referred to as logical windows hereinafter). Each arrow indicates the transition of the window display (to be referred to as a logical transition hereinafter).

The following example will be explained with reference to FIG. 10. More specifically, packages A and B invoke the same application A on the basis of FIG. 5, and use a common window. After displaying the common window, package A displays a specific menu window. To the contrary, after displaying the common window, package B does not display a specific menu window. Package C does not share any window with packages A and B.

A case where the user selects package A in a logical window 1101 for selecting a package will be explained. Upon selecting package A, the logical window 1101 changes to a logical window 1102 via a logical transition 1001. At this time, if a window transition occurs in accordance with a user operation or upon a change of the state of the MFP, the logical window 1102 changes to a logical window 1103 common to packages A and B via a logical transition 1002. If any setting is made, the logical window 1103 changes to a logical window 1104 common to packages A and B via a logical transition 1003. Further, if a logical transition 1004 occurs in accordance with a user operation or upon a change of the state of the MFP, the logical window 1104 changes to a logical window 1105 dedicated to package A. If a window transition occurs in accordance with a user operation or upon a change of the state of the MFP, the logical window 1105 changes to the logical window 1102 via a logical transition 1005.

A case where the user selects package B in the logical window 1101 for selecting a package will be explained. Upon selecting package. B, the logical window 1101 changes to the logical window 1103 common to packages A and B via a logical transition 1012. If any setting is made, the logical window 1103 changes to the logical window 1104 common to packages A and B via the logical transition 1003. Further, if a window transition occurs in accordance with a user operation or upon a change of the state of the MFP, the logical window 1104 changes to the logical window 1103 common to packages A and B via a logical transition 1014.

A case where the user selects package C in the logical window 1101 for selecting a package will be explained. Upon selecting package C, the logical window 1101 changes to a logical window 1122 via a logical transition 1021. If a user operation is done or the state of the MFP changes, the logical window 1122 changes to an unshared logical window 1123 via a logical transition 1022. If a user operation is done or the state of the MFP changes, the logical window 1123 changes to the logical window 1122 via a logical transition 1023.

A concrete example according to the first embodiment will be explained on the basis of the menu window shown in FIG. 4 and tables in FIGS. 11 and 12.

1. Print Document (Corresponding to the Storage Print Button 4004 in FIG. 4 in a Concrete Example of Package A)
(a) function 1: A document stored in the storage (HDD 104) of the MFP main body is designated and printed.
(b) function 2: Deletion of the document stored in the storage is permitted.
(c) function 3: After printing the document in the storage, it is inquired of the user whether or not to delete the stored document.

2. Print Document in Medium (Corresponding to the Media Print button 4005 in FIG. 4 in a Concrete Example of Package B)
(a) function 1: A document stored in the memory (USB memory) connected to the MFP is designated and printed.
(b) function 2: Deletion of the document stored in the memory is inhibited (in order to avoid destruction of the contents of the user's USB memory).

3. Copy (Corresponding to the Copy Button 4007 in FIG. 4 in a Concrete Example of Package C)
("Copy" is not printing a document in the storage, so a window for selecting a document is not displayed.)
[Description of Window Transition Upon Selecting Package A (Storage Print)]

(1) Logical Window 1101

FIG. 4 depicts a view showing an example of a menu window corresponding to the logical window 1101 according to the embodiment. In this window, buttons for designating respective packages are arranged.

FIG. 11 depicts a view illustrating an example of a table describing the structure of the association table "package with category" 501 which stores the association between each package and each category in FIG. 4.

(2) Logical Transition 1001

While the console unit 112 displays the menu window in FIG. 4, the controller unit 100 detects that the user has selected the Storage Print button 4004 corresponding to package A. In this case, the controller unit 100 looks up the association table "package with category" 501 in FIG. 11 to recognize that the category is "print document". Then, the controller unit 100 searches the association table "application with category" 502 for an application whose category is "print document".

FIG. 12 depicts a view illustrating an example of a table describing the structure of the association table "application with category" 502 which stores the association between each application and each category in FIG. 4. In FIG. 12, each of "multi protocol send" and "print document in storage" is associated with two categories. In this way, each of functions can be associated with each category, and each application can be associated with one or a plurality of categories.

Referring to FIG. 12, an application whose category is "print document" is "print document in storage". Then, the application "print document in storage" is launched, and the logical window 1101 changes to the logical window 1102.

(3) Logical Window 1102

Figure 13:
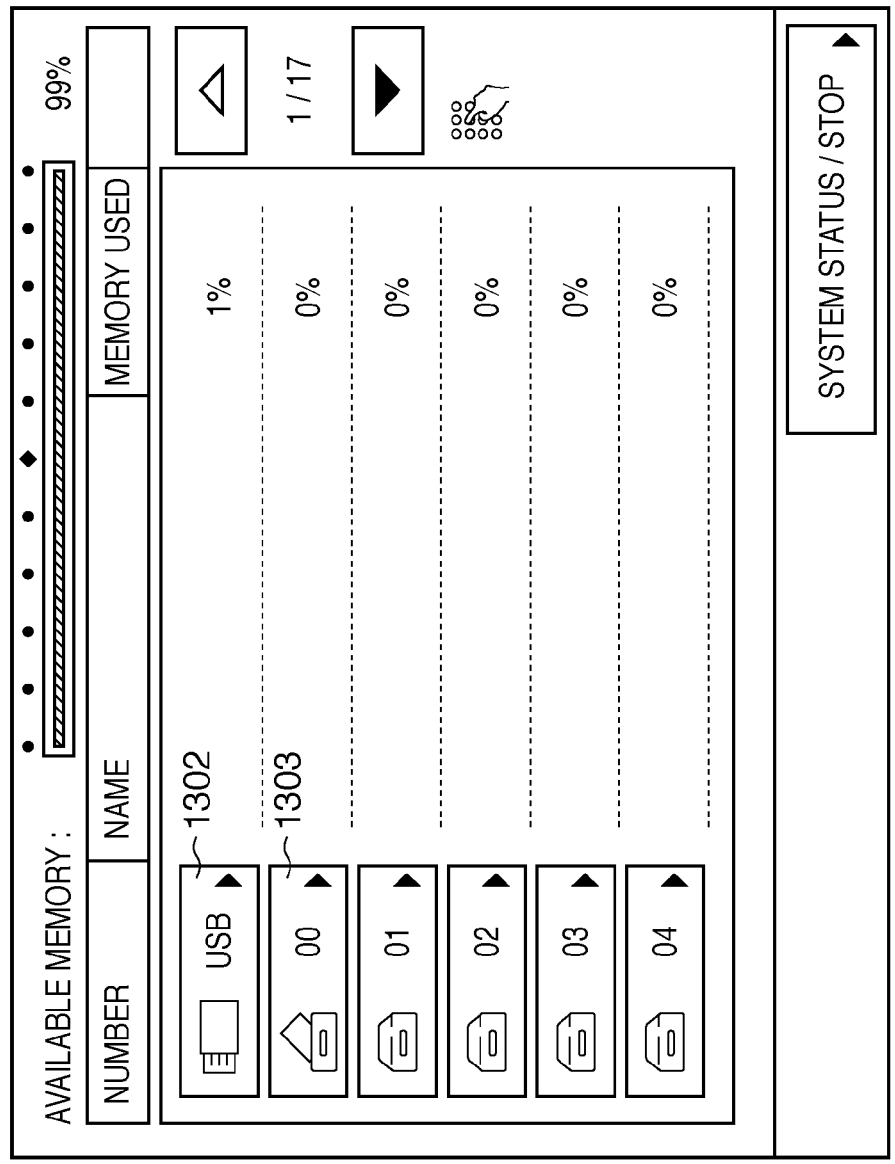
FIG. 13 depicts a view showing an example of a stored document selection window displayed by an application "print document in storage.

After launching the application "print document in storage", the controller unit 100 displays a window corresponding to the logical window 1102 for selecting stored document data, as shown in FIG. 13.

FIG. 13 depicts a view illustrating an example of a window which is displayed by the application "print document in storage" to select a document to be printed in the storage.

The selection window displays buttons in line for selecting a location where document data is stored. A button 1302 displays a document stored in the USB memory. A button 1303 displays a document stored in a document storage area "document folder 00" in the MFP. Buttons for designating "document folder 01" to "document folder 04" are displayed, but no document folder stores document data except "document folder 00". This can be identified from the icons of "document folder 00" and remaining document folders.

(4) Logical Transition 1002

The logical transition 1002 occurs when the user presses the button 1303 in the state of FIG. 13 to select "document folder 00".

(5) Logical Window 1103

Figure 14:
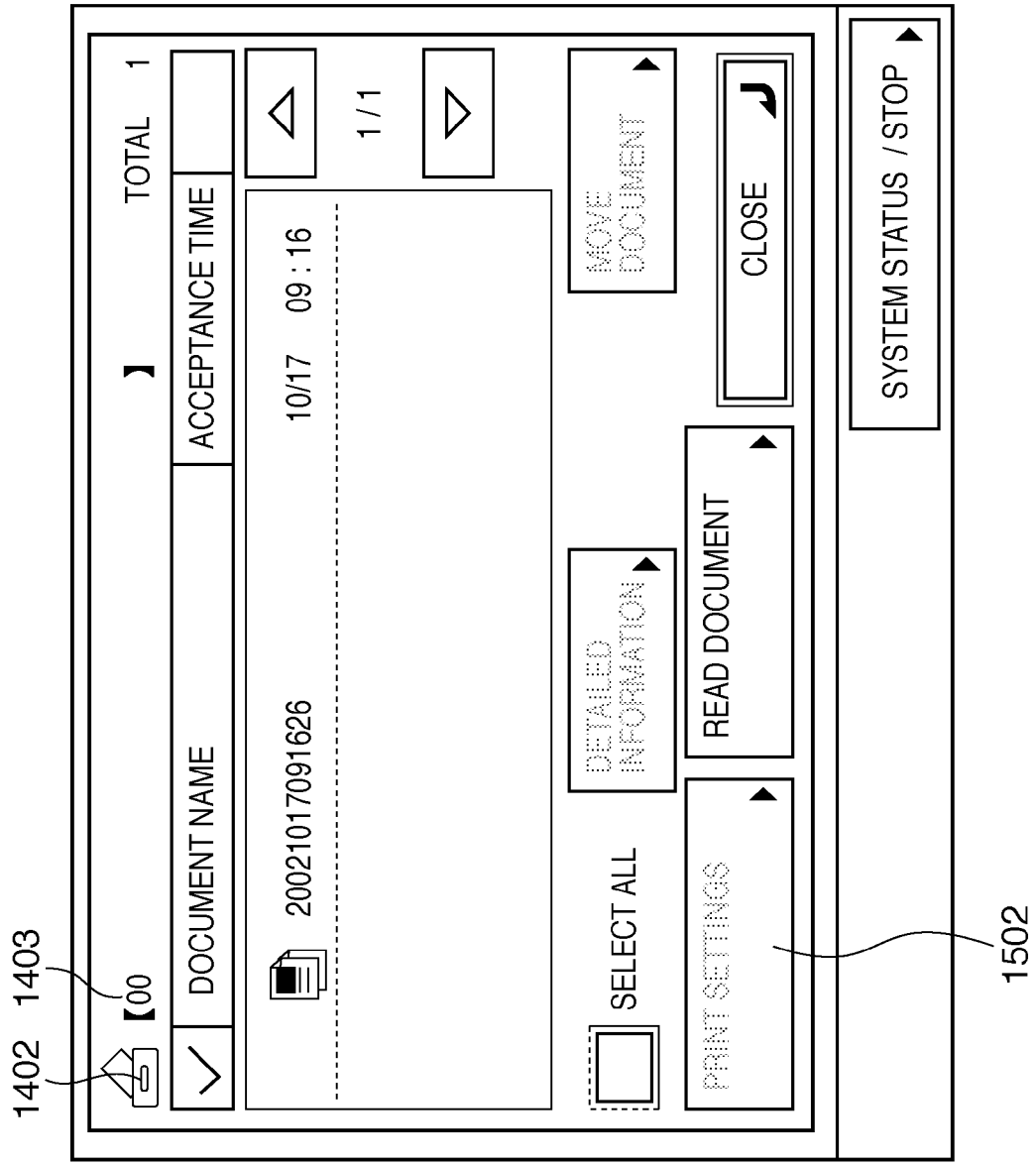
FIG. 14 depicts a view showing a display example of a list of documents stored in a document folder in the MFP according to the embodiment.

When the user presses the button 1303 in FIG. 13, a window shown in FIG. 14 representing a list of documents stored in the document storage area "document folder 00" appears.

FIG. 14 depicts a view showing a display example of a list of documents stored in document folder 00 in the MFP according to the embodiment.

In FIG. 14, a storage location name display area 1403 displays the name (document folder number "00") of a button selected in FIG. 13. A storage location icon 1402 is the icon of "document folder 00" selected in FIG. 13.

In FIG. 14, the icon of a document having a document name "20021017091626" is displayed.

Figure 15:
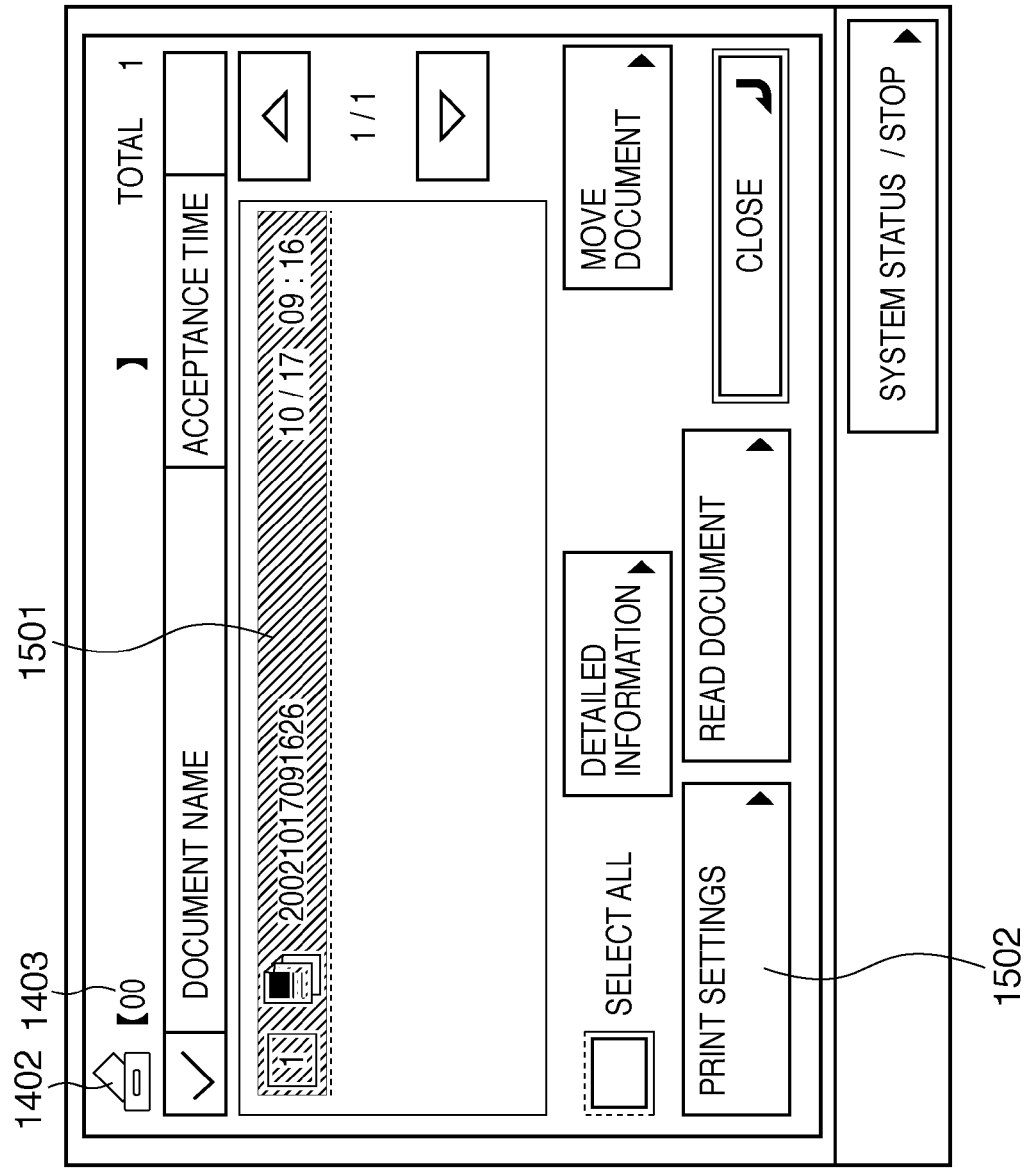
FIG. 15 depicts a view showing a state in which a document displayed in FIG. 14 is selected.

FIG. 15 depicts a view showing a state in which a document displayed in FIG. 14 is selected.

A selected document list 1501 is highlighted in FIG. 15. In addition, a print setting button 1502 which is disabled in FIG. 14 is enabled. When the user presses the print setting button 1502 in this state, a print setting window in FIG. 16 appears.

Figure 16:
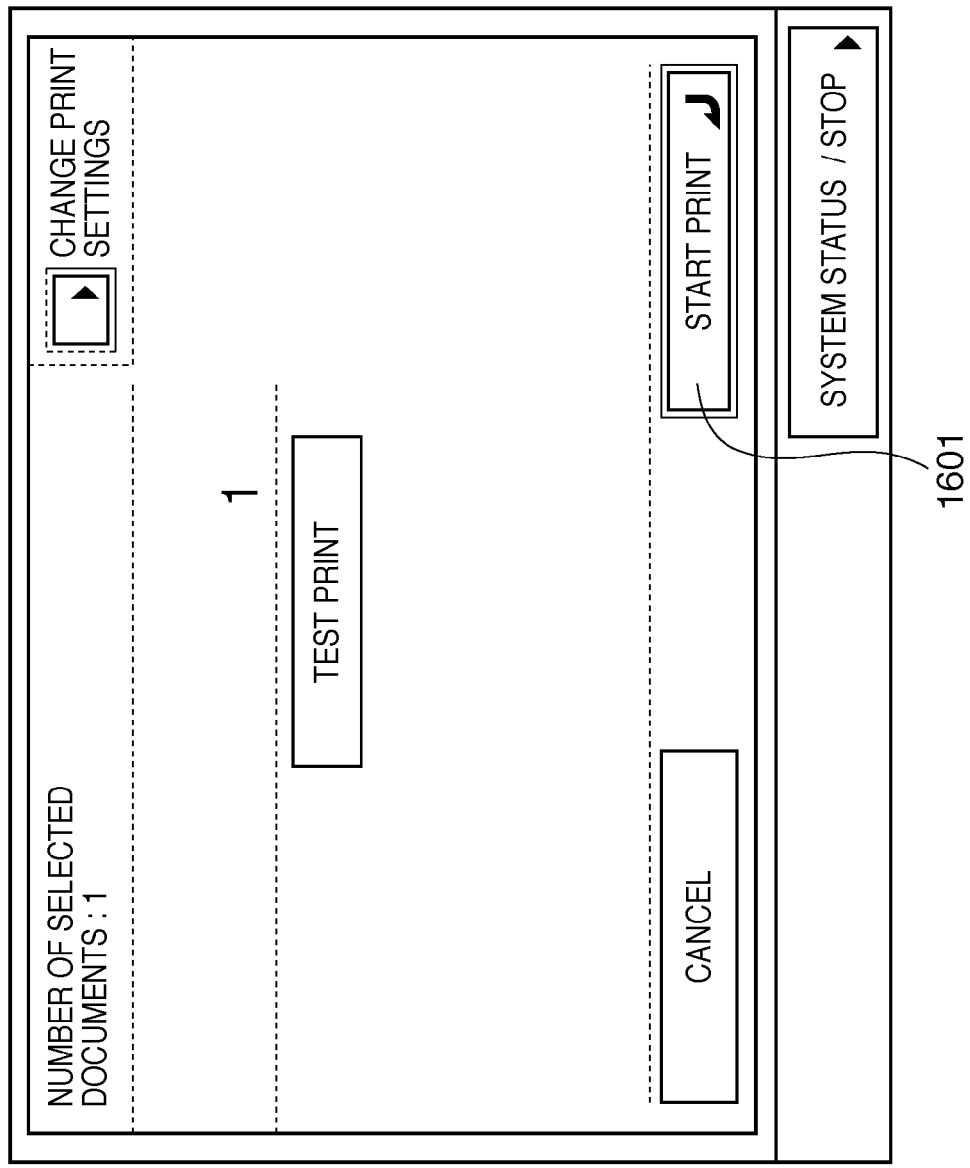
FIG. 16 depicts a view showing an example of a print setting window.

FIG. 16 depicts a view showing an example of the print setting window.

This window allows the user to designate test print. When the user presses a print start button 1601, test print of a document selected in FIG. 15 is executed. By pressing the print start button 1601, print processing starts, and the process shifts to the logical transition 1003.

(6) Logical Transition 1003

The logical transition 1003 represents a transition to print processing.

Figure 17:
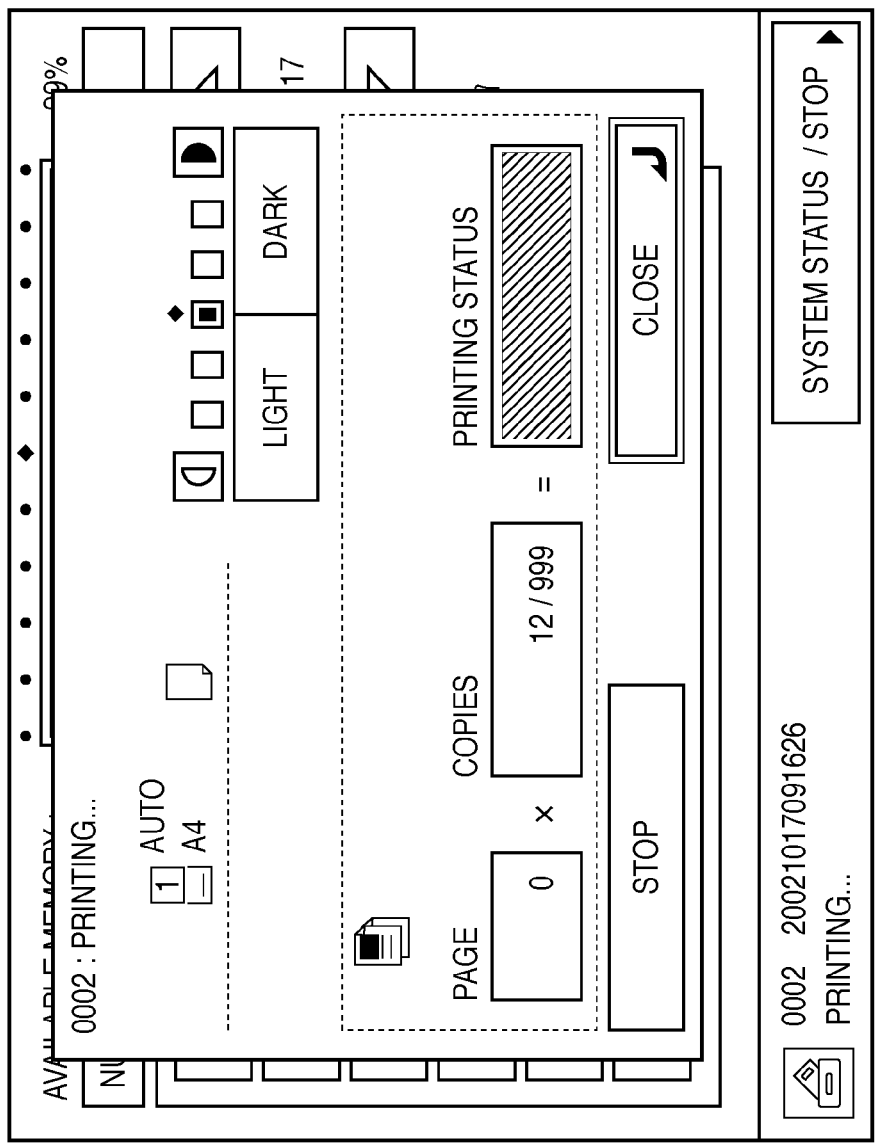
FIG. 17 depicts a view showing an example of a window representing a state (during execution of printing) in which the user presses a print start button in FIG. 16 to start print processing.

FIG. 17 depicts a view showing an example of a window representing a state (during execution of printing) in which the user presses the print start button 1601 in FIG. 16 to start print processing.

(7) Logical Window 1104

A window representing that printing is underway appears as shown in FIG. 17.

(8) Logical Transition 1004

Upon completion of the print processing, the process shifts to the logical transition 1004.

(9) Logical Window 1105

Figure 18:
FIG. 18 depicts a view showing an example of a window for checking whether to delete a document upon completion of printing.

The logical window 1105 is, for example, a window display shown in FIG. 18.

FIG. 18 depicts a view showing an example of a window for checking whether to delete a printed document upon completion of printing.

A button 1801 is used to designate holding of the printed document without deleting it. A button 1802 is used to designate deletion of the printed document. The window shown in FIG. 18 changes to the logical window 1105 dedicated to package A (Storage Print). In FIG. 18, the user can select whether to delete the document which has been printed and is stored in the storage (box). In contrast, in a case that document stored in the USB memory is printed (the user selects the button 4005 in FIG. 4), the printed document cannot be deleted, and thus the window shown in FIG. 18 does not appear. In this manner, even if print processing is completed in the logical window 1104, the transition destination changes depending on the category of a running application.

When the user presses the "hold" button 1801, the window in FIG. 18 disappears and returns to one in FIG. 13. When the user presses the "delete" button 1802, the document in the HDD 104 that is selected in FIG. 15 is deleted, and the window in FIG. 18 returns to a window display as shown in FIG. 13.

[Description of Window Transition Upon Selecting Package B]

(1) Logical Window 1101

The logical window 1101 represents a state in which a menu window as shown in FIG. 4 is displayed. In this window, buttons for designating respective packages are arranged. The association between the package and the category in this case is designated in the association table "package with category" 501 shown in FIG. 11.

Assume that the user presses the Media

Print button 4005 whose category is "print document in medium". In response to this operation, the process shifts to the logical transition 1012.

(2) Logical Transition 1012

The controller unit 100 detects that the user has selected the Media Print button 4005 in the menu window of FIG. 4. The controller unit 100 looks up the association table "package with category" 501 in FIG. 11 to recognize that the category of the Media Print button 4005 is "print document in medium". Then, the controller unit 100 searches the association table "application with category" 502 for an application whose category is "print document in medium". In the table 502 of FIG. 12, the associated application is "print document in storage", and thus is launched. After launching the application "print document in storage", the USB is selected as the storage location of the document because the category of the application is "print document in medium". Then, a document list window (FIG. 19) appears.

(3) Logical Window 1103

Figure 19:
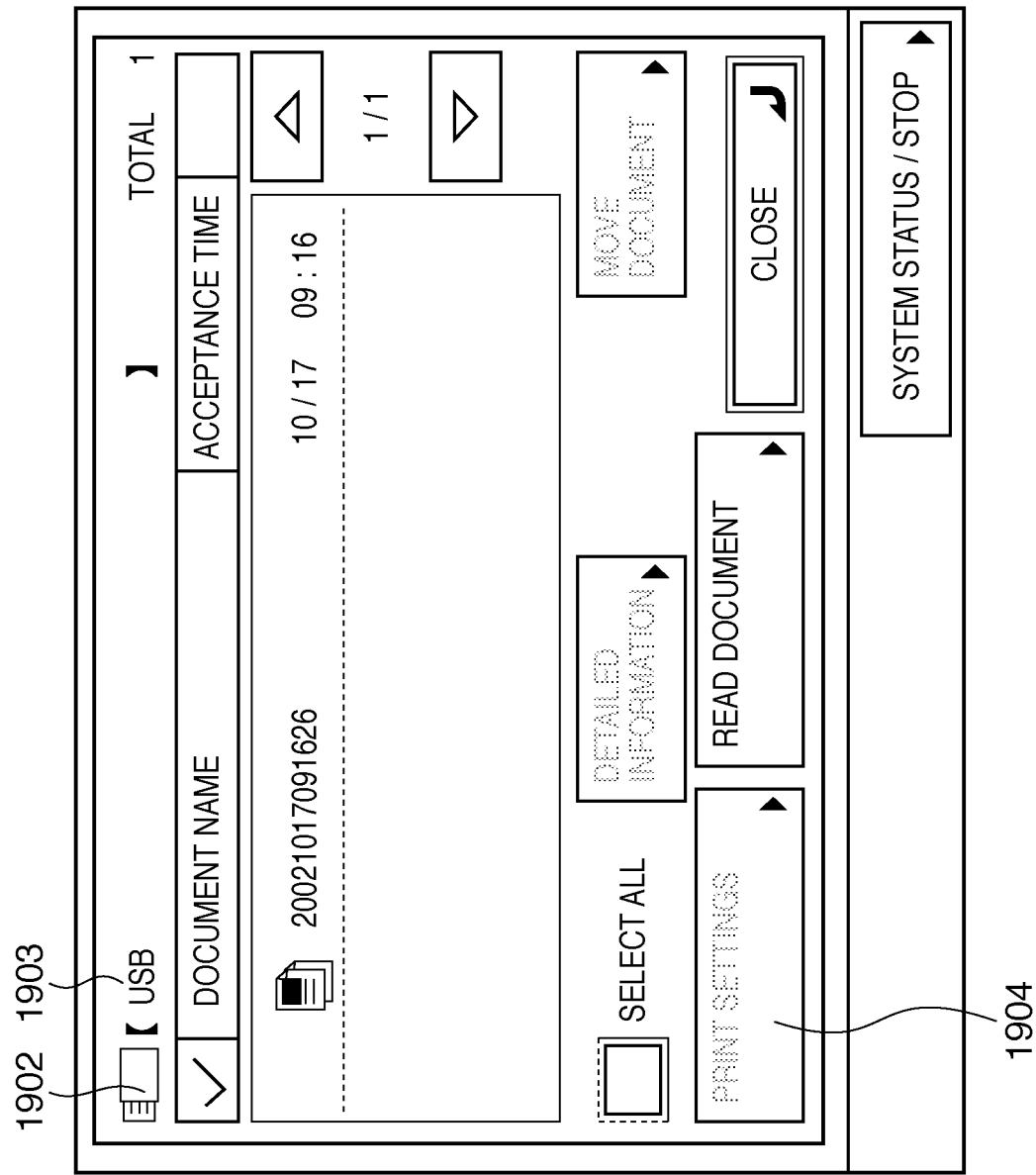
FIG. 19 depicts a view showing an example of a window representing a list of documents stored in a USB memory.

FIG. 19 depicts a view showing an example of a window representing a list of documents stored in the USB memory.

This window is a modification of the document list window display shown in FIG. 14 in accordance with a storage location. The state in FIG. 19 is identical to that when the user presses the button 1302 in FIG. 13 to designate the USB. In FIG. 19, a storage location name display area 1903 displays the name "USB" of the selected button, and a storage location icon (USB icon) 1902 displays the icon of the selected button. In FIG. 19, buttons of "print settings", "detailed information" and "move document" gray out.

Figure 20:
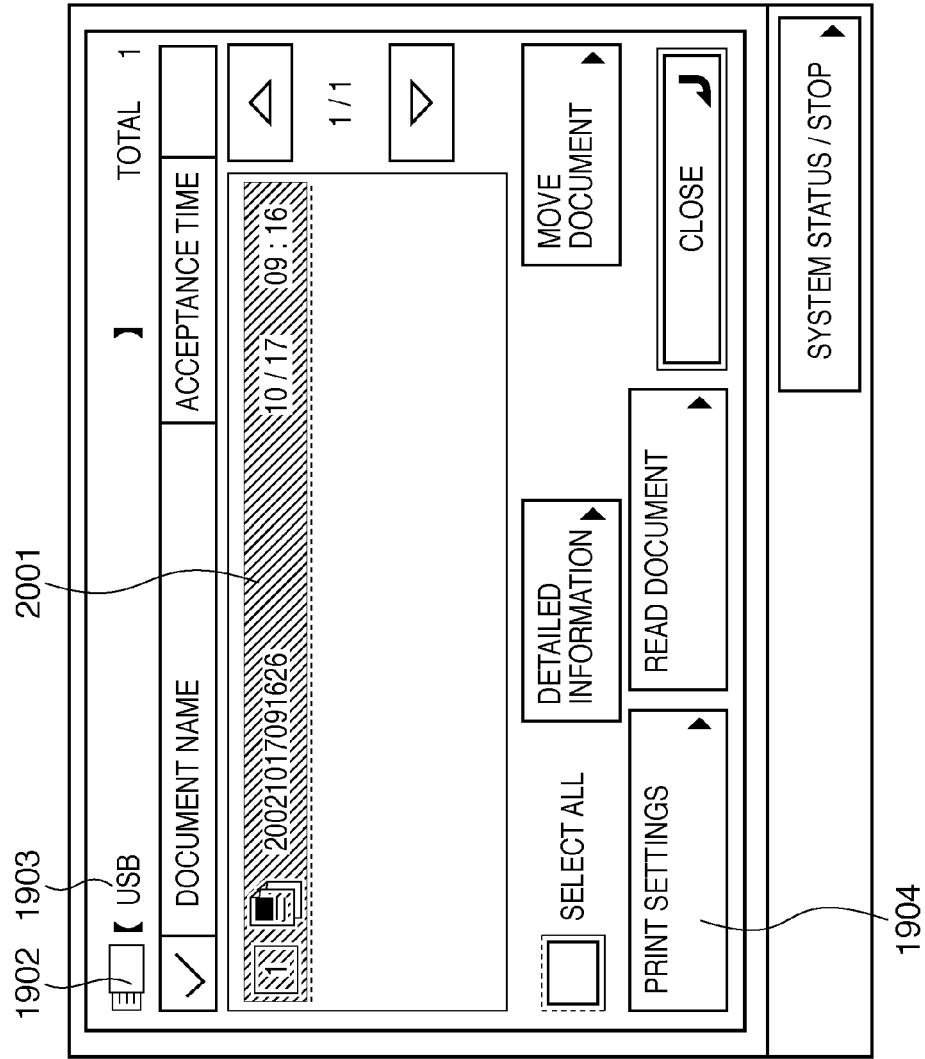
FIG. 20 depicts a view showing a state in which a document list shown in FIG. 19 is selected.

FIG. 20 depicts a view illustrating an example of a state in which a document list shown in FIG. 19 is selected.

In FIG. 20, a selected document list 2001 is highlighted. In addition, a print setting button 1904 which is disabled in FIG. 19 is enabled. When the user presses the print setting button 1904, the print setting window in FIG. 16 appears, similar to the above-described case of FIG. 15.

(4) Logical Transition 1003

If the user presses the print start button 1601 in FIG. 16, a window shown in FIG. 17 representing that printing is in progress appears.

(5) Logical Window 1103

The logical window 1103 is the window shown in FIG. 17 representing that printing is in progress.

(6) Logical Transition 1004

Upon completion of printing in FIG. 17, the window returns to one shown in FIG. 19 for selecting a document to be printed. In this case, the window shown in FIG. 18 for checking whether or not to delete a printed document is not displayed, unlike the above-described case of package A (Storage Print), in order to implement function 2 (inhibiting deletion of a printed document stored in the storage medium) in "print document in medium", as described above.

[Description of Window Transition Upon Selecting Package C]

(1) Logical Window 1101

The logical window 1101 represents a state in which the menu window shown in FIG. 4 is displayed. If the user presses the Copy button 4007 to designate the copy function corresponding to package C, the process shifts to the logical transition 1021.

(2) Logical Transition 1021

In a case that the controller unit 100 detects that the user has selected the Copy button 4007 in the menu window of FIG. 4, it looks up the association table "package with category" 501 in FIG. 11 to obtain the category "copy". The controller unit 100 looks up the association table "application with category" 502 in FIG. 12 to obtain an application "copy". Then, the controller unit 100 launches the application "copy".

(3) Logical Window 1122

Figure 21:
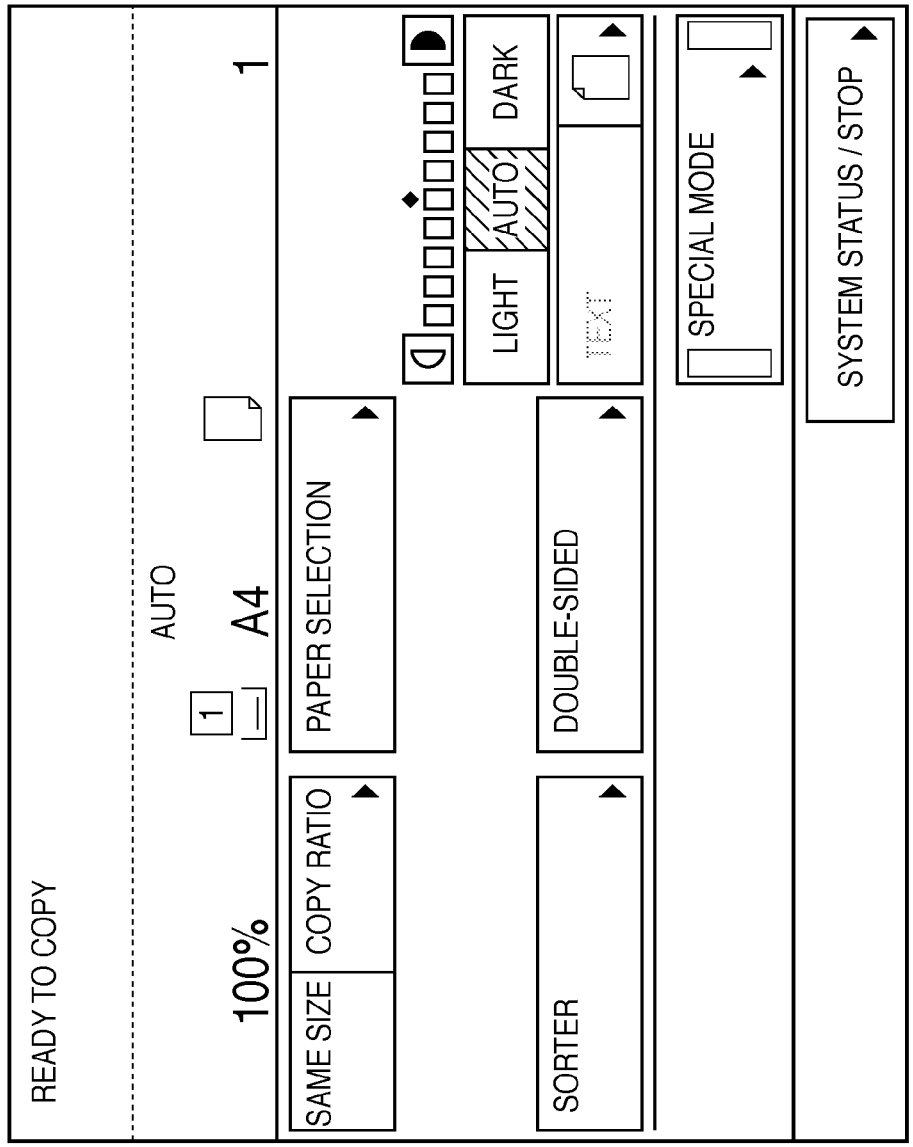
FIG. 21 depicts a view showing an example of a copy setting window displayed by an application "copy"

FIG. 21 depicts a view showing an example of a copy setting window displayed by the application "copy". This window allows the user to make copy settings such as the copy scaling, paper size, and the number of copies.

(4) Logical Transition 1022

If the user presses the start key 314 of the console unit 112 while the copy setting window as shown in FIG. 21 is displayed, the copy operation starts, and the process shifts to the logical transition 1022.

(5) Logical Window 1123

Figure 22:
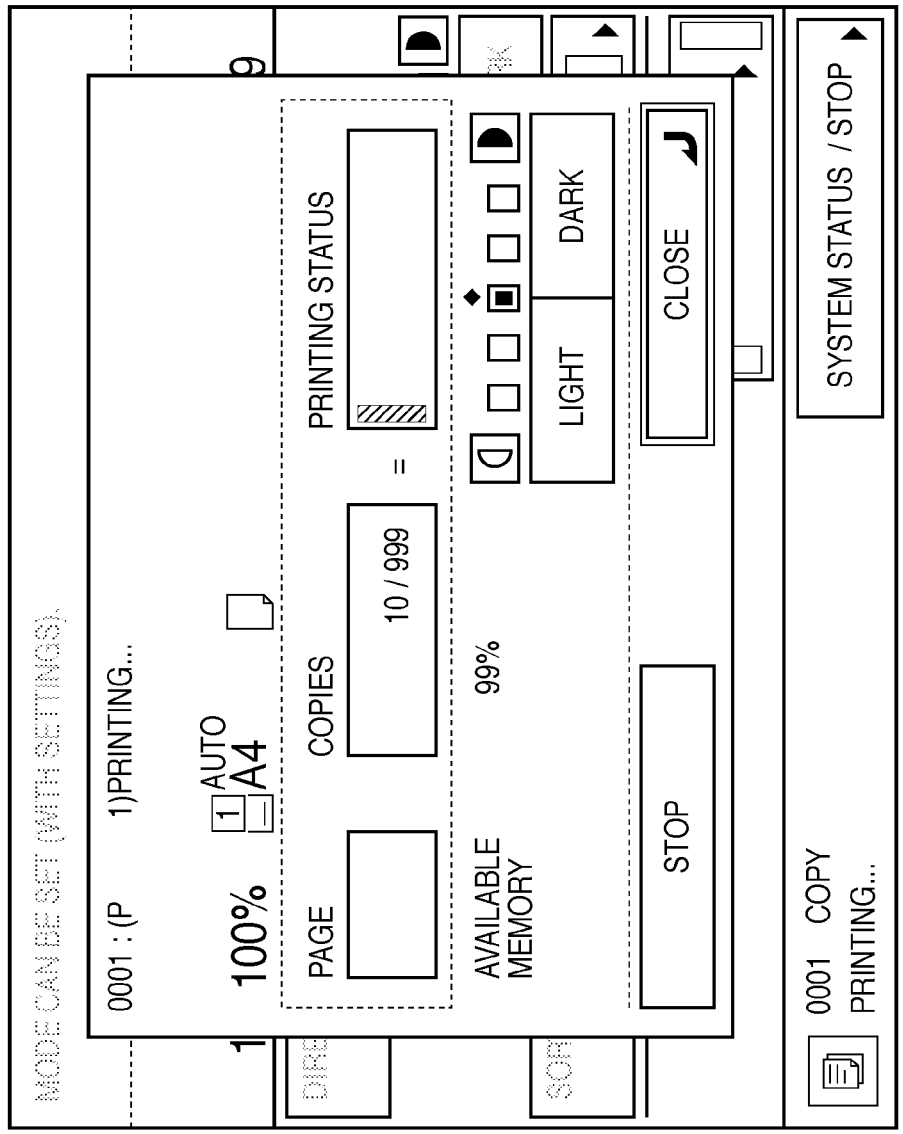
FIG. 22 depicts a view showing an example of a window representing that copying is underway after copying starts.

FIG. 22 depicts a view showing an example of a window representing that copying is underway after copying starts. More specifically, if the user presses the start key 314 of the console unit 112 while the logical window 1122 is displayed, the logical window 1123 shown in FIG. 22 appears via the logical transition 1022.

(6) Logical Transition 1023

Upon completion of copying in FIG. 22, the display on the display 313 of the console unit 112 returns to the state in FIG. 21 via the logical transition 1023.

<Description of Operation (FIG. 10)>

Figure 23:
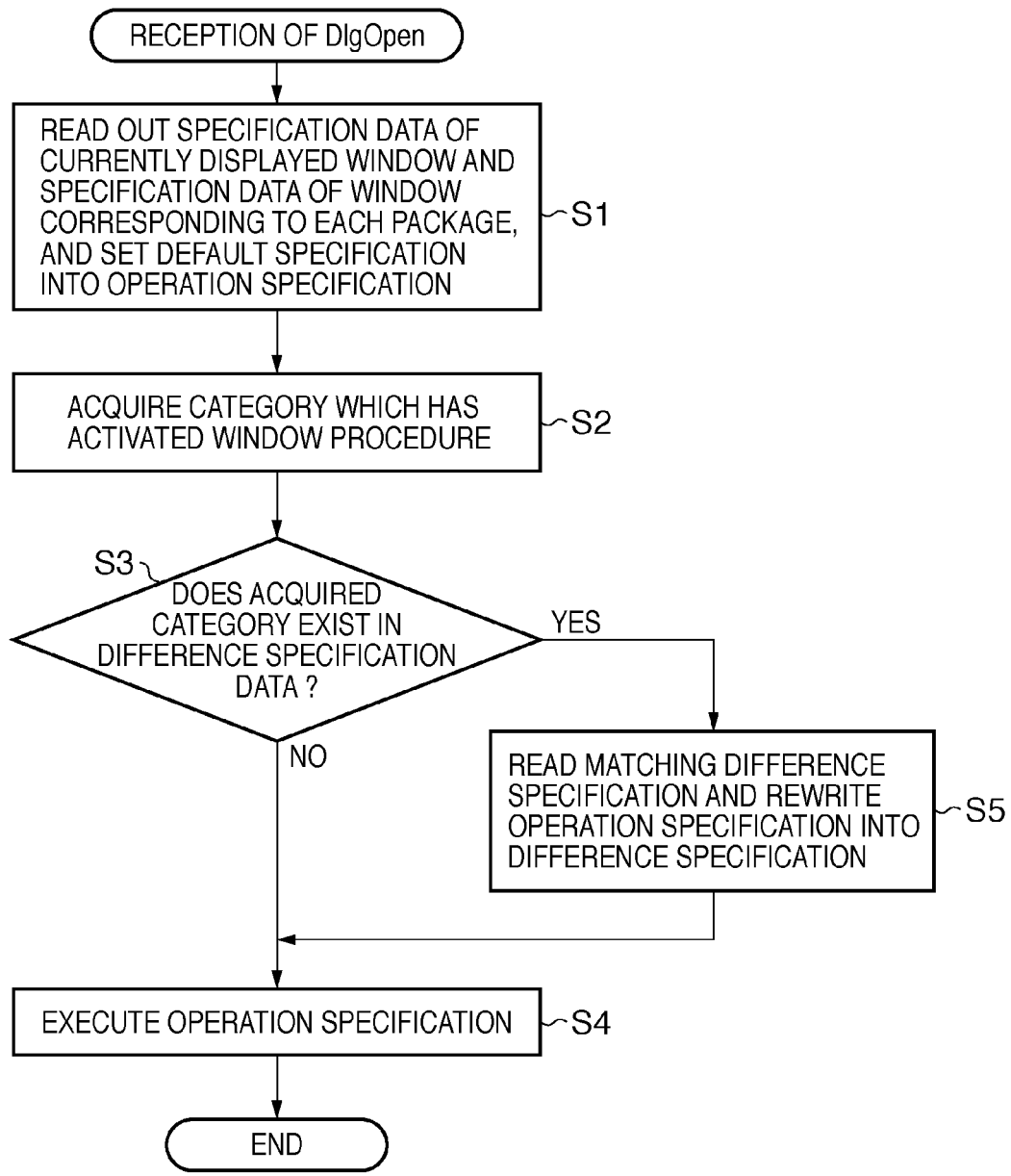
FIG. 23 is a flowchart explaining processing by a controller unit according to the embodiment.

FIG. 23 is a flowchart explaining processing by the controller unit 100 according to the embodiment. Processing upon receiving an instruction DigOpen to launch the application of the package Storage Print or Media Print will be explained. The window procedure is a program which is executed by the CPU 101 to control the display on the display 313 of the console unit 112 in correspondence with the logical windows in FIG. 10. The window procedure is installed in the HDD 104, and in execution, stored in the RAM 102.

In step S1, the window procedure reads out specification data set in a currently displayed window and specification data of a window corresponding to the category of each package, and obtains difference specification data representing the difference between them. Then, the window procedure sets a default specification into the operation specification. At this time, the operation specification becomes NULL, which indicates that the default specification has not changed. In this case, for example, the difference specification data corresponds to "inhibiting deletion of a printed document stored in the storage medium" in "print document in medium".

The process advances to step S2 to acquire the category (see FIG. 11) of an application which has launched the window procedure. In this case, the category is "print document" or "print document in medium". Assume that the category acquired in step S2 is "print document". The process advances to step S3 to determine whether difference specification data corresponding to the category acquired in step S2 exists in the difference specification data obtained in step S1. In this case, there is no corresponding difference specification data exists, the process advances from step S3 to step S4 to execute window display processing in accordance with the default operation specification set in step S1.

On the other hand, if the category acquired in step S2 is "print document in medium", then it is determined in step S3 that the difference specification data corresponding to the category acquired in step S2 exists in the difference specification data obtained in step S1, and the process advances to step S5 to read the difference specification which matches the category. The operation specification set as a default in step S1 is rewritten into the difference specification. After that, the process advances to step S4 to execute window display processing in accordance with the rewritten operation specification.

For example, in a case that the category of the window procedure is "print document", difference specification data corresponding to the category does not exist in step S3, so the process advances to step S4. The window procedure displays the "document list display window" (FIG. 14). For example, when the category of the window procedure is "print document in medium", difference specification data corresponding to the category exists in step S3, so the process advances to step S5 to rewrite the operation specification. Thereafter, the process advances to step S4 to execute the operation specification. In this case, in step S4, the window procedure sets "USB" in the setting variable, and displays the "document list display window" (FIG. 19).

<Description of Operation (FIG. 17)>

Figure 24:
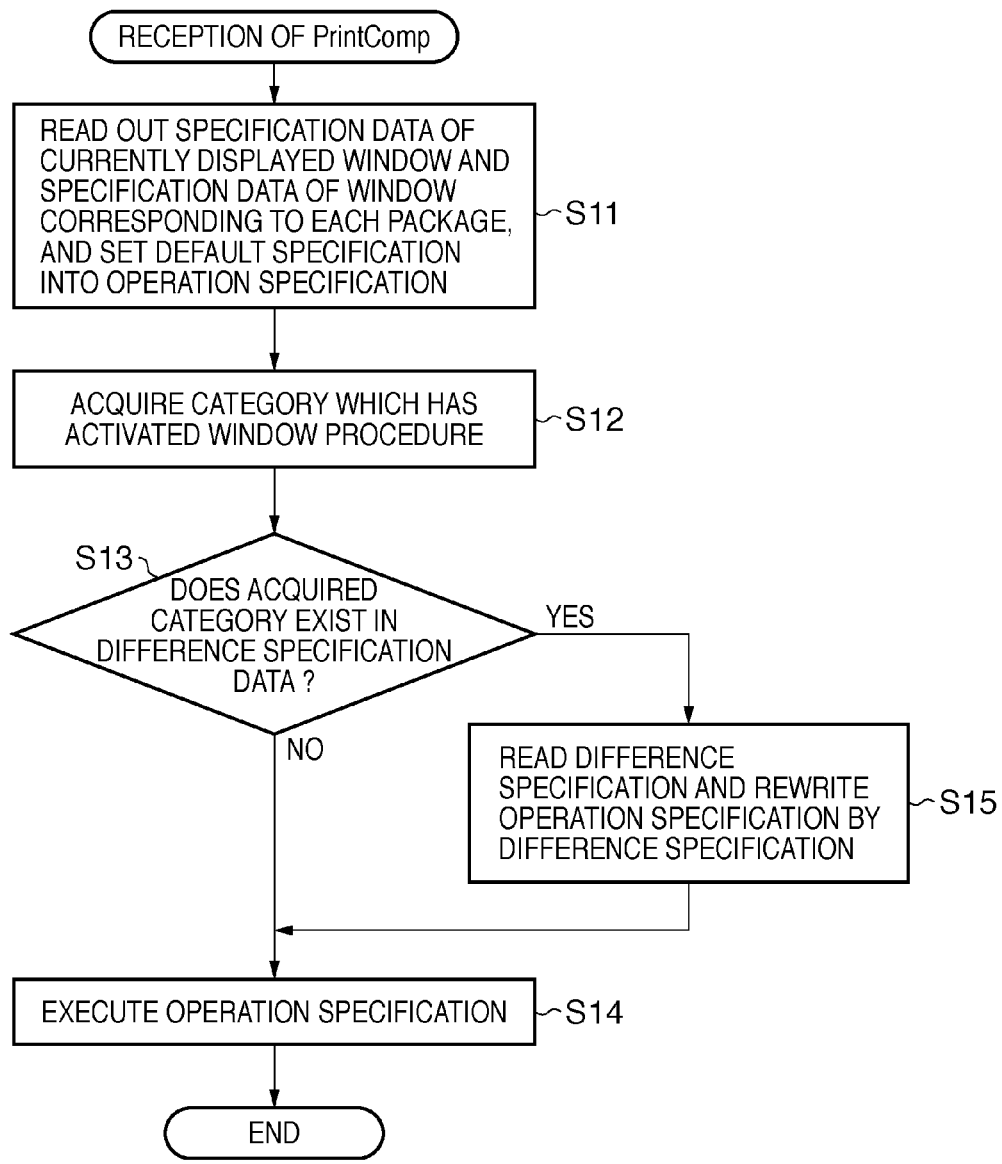
FIG. 24 is a flowchart explaining processing by the controller unit according to the embodiment.

FIG. 24 is a flowchart explaining processing by the controller unit 100 according to the embodiment. The operation of the window procedure upon receiving a print completion status PrintComp when an application corresponding to the package Storage Print or Media Print runs will be explained.

The window procedure starts this processing upon receiving the completion of printing. In step S11, the window procedure reads out difference specification data representing the difference between specification data set in a currently displayed window and specification data of a window corresponding to the category of each package. Then, the window procedure sets a default specification into the operation specification. At this time, the operation specification becomes a "deletion check window".

The process advances to step S12 to acquire the category of a package of an application which has launched the window procedure. In this case, assume that the category is "print document". In step S13, the window procedure determines whether the category acquired in step S12 exists in the difference specification data read in step S11. In this case, a difference specification with respect to "print document" does not exist. Thus, the process advances to step S14, and the window procedure changes the display to the "deletion check window" shown in FIG. 18.

To the contrary, assume that it is determined in step S13 that the category of the package "Media Print" acquired in step S12 exists in the difference specification data read in step S11. In this case, the process advances from step S13 to step S15, and the window procedure rewrites the display from the "deletion check window" into the "Print Document in Medium window" in the operation specification. After that, the process advances to step S14 to execute the operation specification. The window procedure changes the display to the "print document in medium" window as shown in FIG. 19.

For example, in a case that the category of the window procedure is "print document", difference specification data corresponding to the category does not exist in step S13, so the process advances to step S14. The window procedure displays the "deletion check window" (FIG. 18). On the other hand, if the category of the window procedure is "print document in medium", difference specification data (inhibiting deletion of a printed document stored in the storage medium in "print document in medium") corresponding to the category exists in step S13, so the process advances to step S15 to rewrite the operation specification. Thereafter, the process advances to step S14 to execute the operation specification. In this case, in step S14, the window procedure sets "completion of printing" in the setting variable, and displays the "Media Print window" (FIG. 19).

As described above, according to the first embodiment, even if the same state occurs during execution of an application, the procedure can shift to different processing in accordance with the category of the running application.

[Second Embodiment]

The second embodiment of the present invention will be described. In the second embodiment, not the window transition but the window display changes. The basic arrangement of an MFP is the same as that described in the first embodiment, and a description corresponding to the description of the concept of the operation and a subsequent description in the first embodiment will be explained.

<Description of Concept of Operation>

Figure 25:
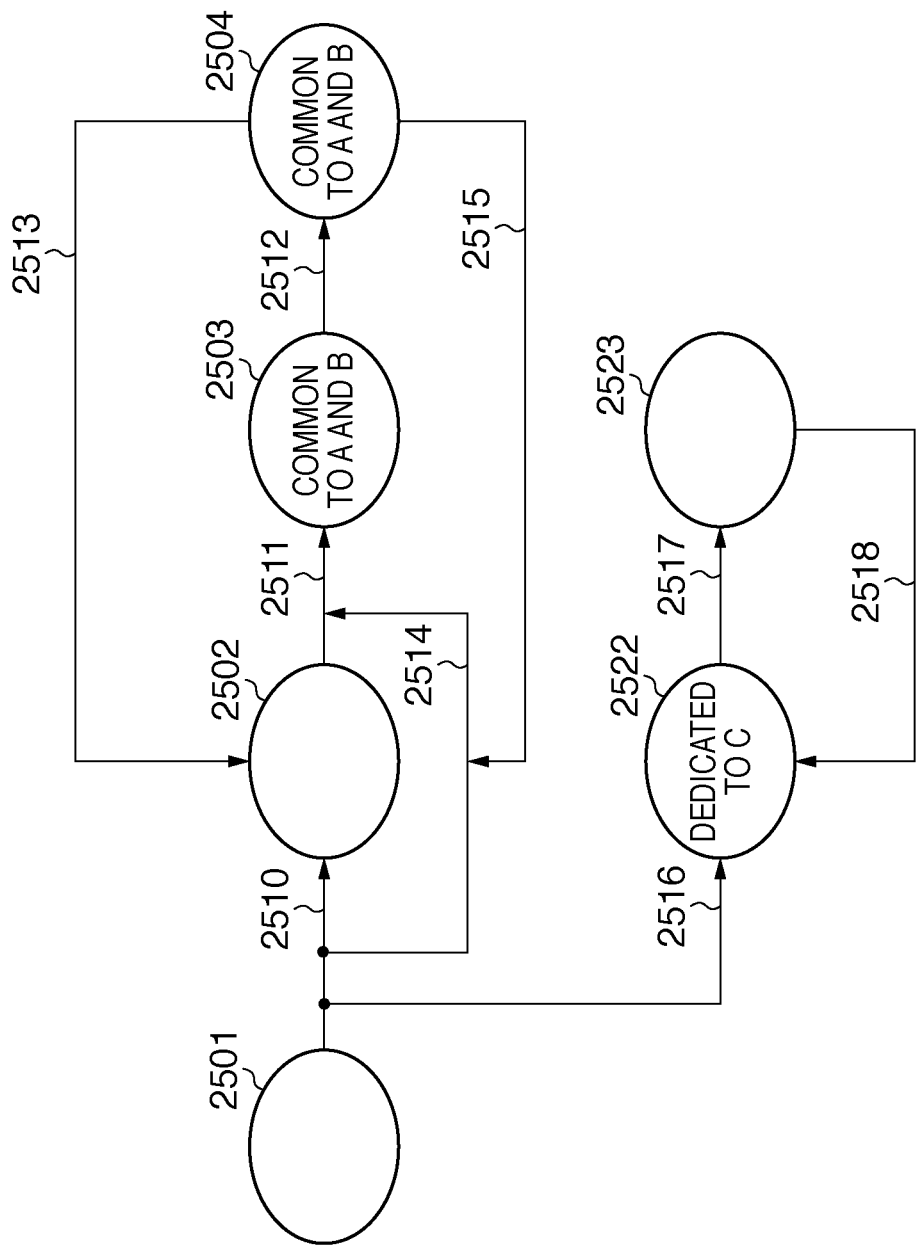
FIG. 25 depicts a view for logically explaining the transition of an operation window according to the second embodiment.

FIG. 25 depicts a view for logically explaining an example of the transition of an operation window according to the second embodiment. The notation is the same as that in the above-described first embodiment (FIG. 10).

An example of changing the window configuration depending on an invoked package though packages A and B use the same window (common window) will be explained.

Note that package C does not share any window. The operation differs between a case where package A is selected in a window corresponding to a logical window 2502, and a case where package B is selected. This is the same as in the first embodiment, and a description thereof will not be repeated.

If the user selects package A in a logical window 2501 for selecting a package, the logical window 2502 appears via a logical transition 2510. If a user operation is done or the state of the MFP changes in the logical window 2502, a logical window 2503 common to packages A and B appears via a logical transition 2511. If a user operation is done or the state of the MFP changes in the logical window 2503, a logical window 2504 common to packages A and B appears via a logical transition 2512. If a window transition occurs in accordance with a user operation or upon a change of the state of the MFP, the logical window 2502 appears via a logical transition 2513.

If the user selects package B in the logical window 2501 for selecting a package, the logical window 2503 common to packages A and B appears via a logical transition 2514. If any setting is made, the logical window 2504 common to packages A and B appears via the logical transition 2512. Further, if a window transition occurs in accordance with a user operation or upon a change of the state of the MFP, the logical window 2503 common to packages A and B appears via a logical transition 2515.

If the user selects package C in the logical window 2501 for selecting a package, a logical window 2522 for setting package C appears via a logical transition 2516. If any function is selected, an unshared logical window 2523 appears via a logical transition 2517. If a user operation is done or the state of the MFP changes, the logical window 2522 for package C appears via a logical transition 2518.

<Description of Concrete Example>

As described above, in the second embodiment, the transitions of the logical windows 2503 and 2504 are identical, but the specifications of a window corresponding to the logical window 2503 change depending on the package. A concrete example of this will be examined for three packages having the same external specifications as those in the first embodiment.

1. Print Document (Concrete Example of Package A (Storage Print))
(a) function 1: A document stored in an HDD 104 of the MFP main body is designated and printed.
(b) function 2: Deletion of the document in the storage is permitted.
(c) function 3: Upon completion of printing of a printed document, it is inquired of the user whether to delete the printed document.

2. Print Document in Medium (Concrete Example of Package B (Media Print))
(a) function 1: A document stored in a medium connected to the MFP main body is designated and printed.
(b) function 2: Deletion of the document in the medium is inhibited (in order to avoid destruction of the contents of the user's medium).

3. Copy (Concrete Example of Package C)
(No document exists in the storage, so no document selection window is displayed.)

[Description of Window Transition Upon Selecting Package A (Storage Print)]

(1) Logical Window 2501
A menu window corresponding to the logical window 2501 for a logical description as shown in FIG. 4 is displayed. In this window, icons for invoking respective packages are arranged, as described above.

(2) Logical Transition 2510
The user selects a Storage Print button 4004 in the menu window of FIG. 4 to invoke "print document in storage".

(3) Logical Window 2502
A window as shown in FIG. 13 corresponding to the logical window 1102 in FIG. 10 is displayed for selecting a document storage location appears. The selection window displays buttons in line for selecting a storage location.

(4) Logical Transition 2511
The logical transition 2511 represents a transition upon pressing a button 1303 for selecting "document folder 00" in FIG. 13.

Figure 26:
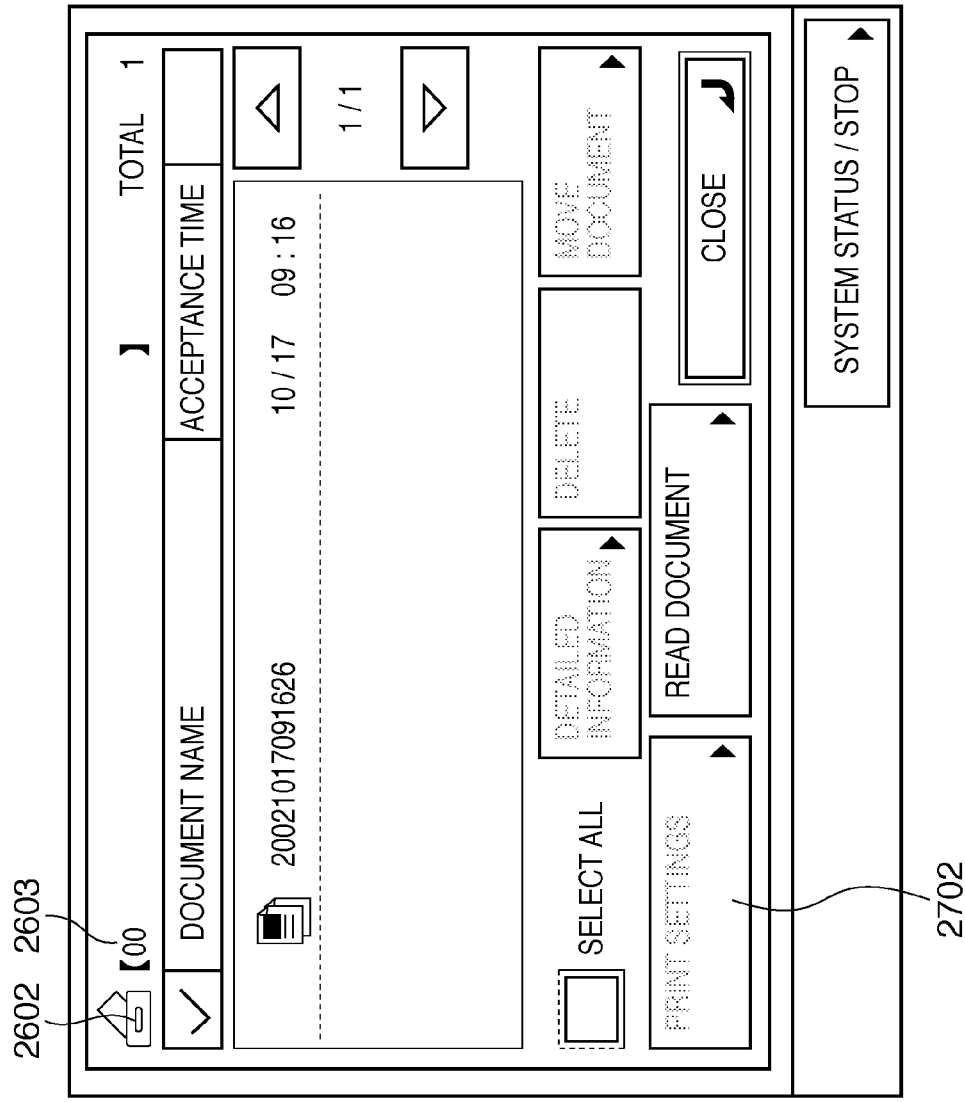
FIG. 26 depicts a view showing a display example of a list of documents stored in a document storage area "document folder 00"

(5) Logical Window 2503
The logical window 2503 is a window as shown in FIG. 26 representing a list of documents stored in the document storage area "document folder 00".

FIG. 26 depicts a view illustrating a display example of a list of documents stored in the document storage area "document folder 00".

In FIG. 26, a storage location name display area 2603 displays the name ("00" representing the number of "document folder 00") of a button selected in FIG. 13. A storage location icon 2602 is the icon of the button selected in FIG. 13. In FIG. 26, buttons of "print settings", "detailed information", "delete" and "move document" gray out.

Figure 27:
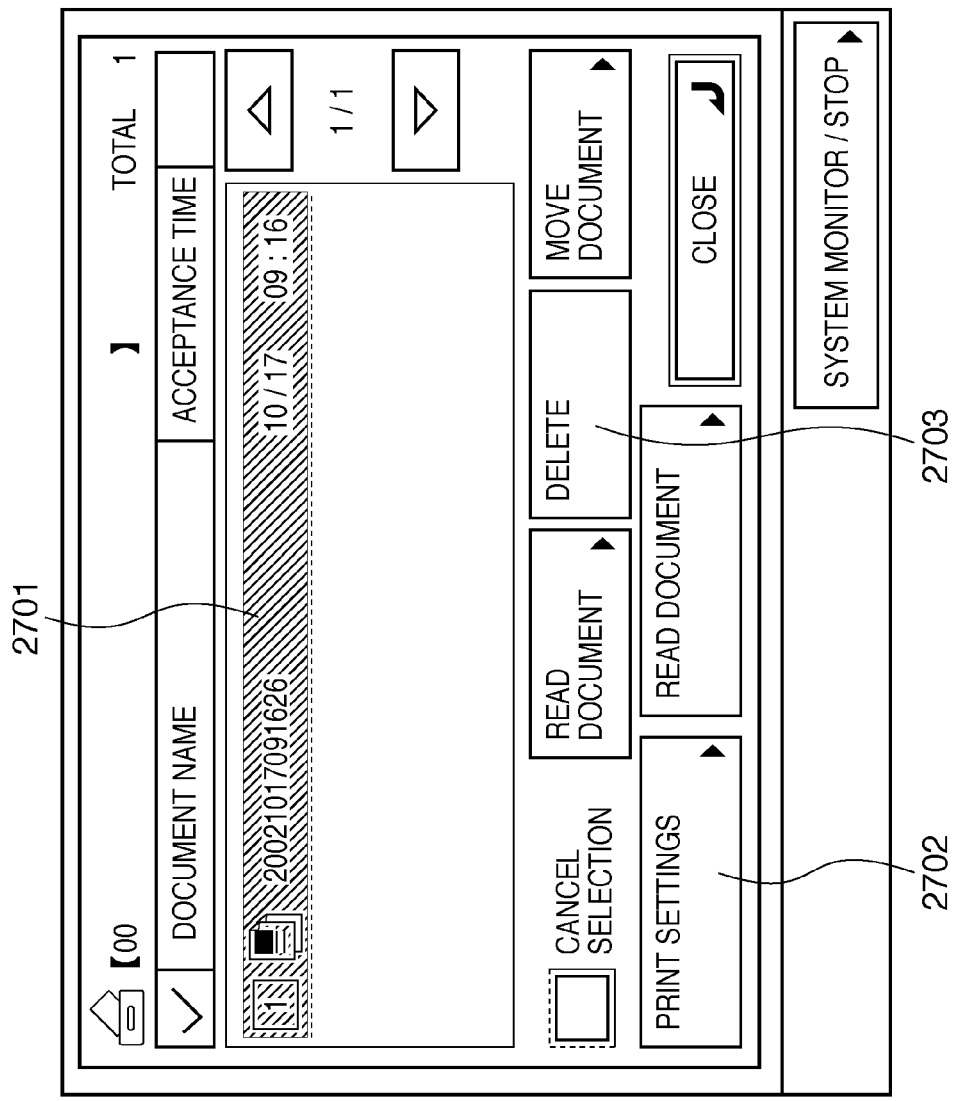
FIG. 27 depicts a view showing a state in which a document list is selected in the state of FIG. 26.

FIG. 27 depicts a view showing a state in which a document list 2701 is selected in the state of FIG. 26.

A selected document list 2701 is highlighted. In addition, a print setting button 2702 and delete button 2703 which are disabled in FIG. 26 are enabled. When the user presses the print setting button 2702 in this state, a print setting window in FIG. 28 appears. When the user presses the delete button 2703, a selected document is deleted.

Figure 28:
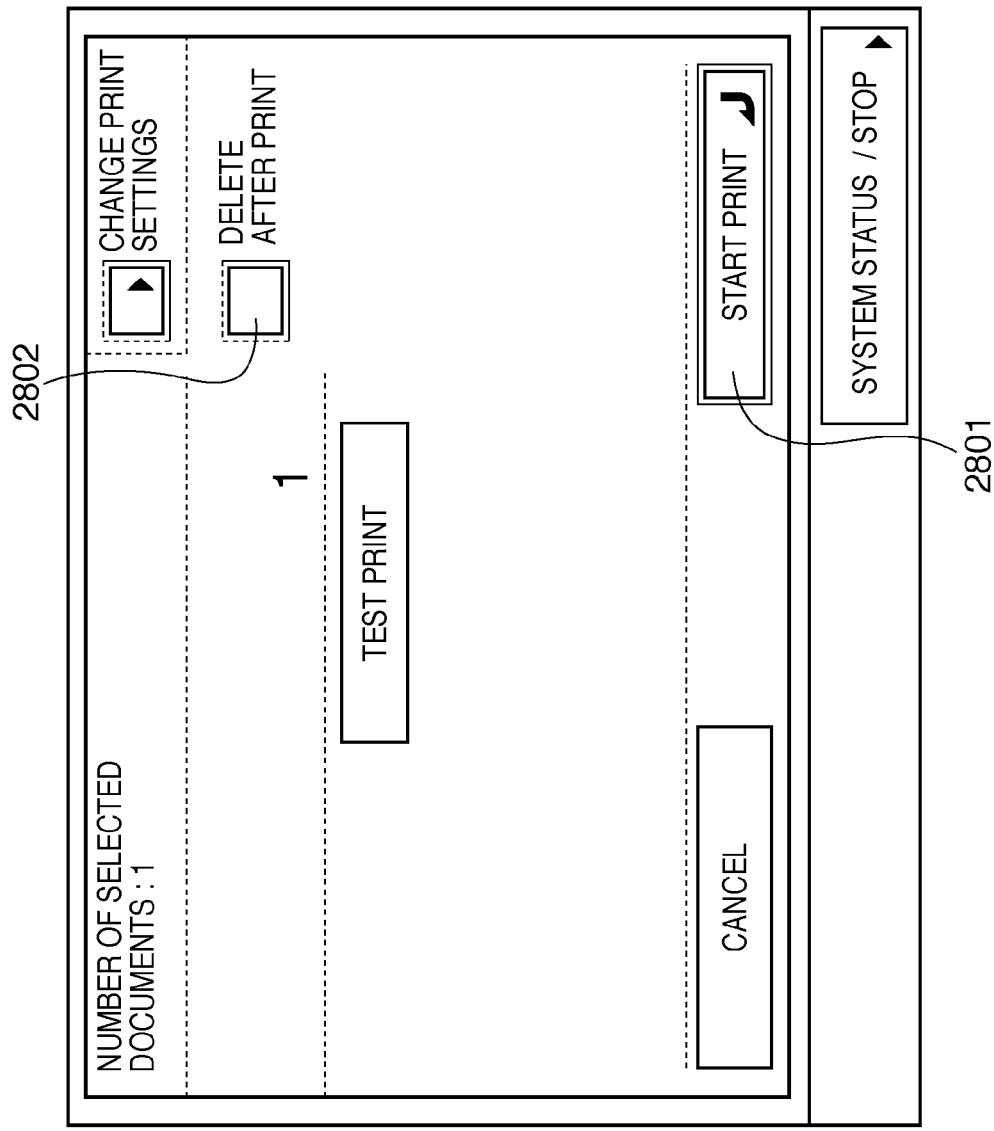
FIG. 28 depicts a view showing an example of a print setting window.

FIG. 28 is a view showing an example of the print setting window.

If the user presses a "delete after print" button 2802 in the print setting window, deletion of a selected document is designated upon completion of printing. If the user presses a print start button 2801, a window display (logical window 2504) in FIG. 17 representing that printing is underway appears.

(6) Logical Transition 2512
The logical transition 2512 represents a state transition upon pressing the print start button 2801 in the state of FIG. 28.

(7) Logical Window 2504
The logical window 2504 is a window display shown in FIG. 17 representing that printing is underway.

(8) Logical Transition 2513
The logical transition 2513 is a transition upon completion of printing in the window display shown in FIG. 17. After that, the window in FIG. 17 disappears, and returns to the window (logical window 2502) in FIG. 13.

[Description of Window Transition Upon Selecting Package B]

(1) Logical Window 2501
The menu window shown in FIG. 4 appears.

(2) Logical Transition 2510
The user selects the Media Print button 4005 in the menu window to invoke Media Print.

(3) Logical Transition 2514
There is no actual window corresponding to the logical window 2502. More specifically, the document list shown in FIG. 13 is displayed for the above-described package A "Storage Print". However for Media Print, it is known that the USB memory stores document data, so the document list window shown in FIG. 19 appears.

(4) Logical Window 2503

The logical window 2503 is a window display as shown in FIG. 19 representing a list of documents stored in the USB memory.

If the user selects a document list from the displayed list of documents, the display changes to one shown in FIG. 20.

A comparison between the window (FIG. 27) for package A and one in FIG. 20 reveals that the "delete button 2703" in FIG. 27 for deleting a selected document is not displayed in the window of FIG. 20 in order to implement function 2 "print document in medium" (inhibiting deletion of a document in the storage) in the above-described first embodiment. In FIG. 20, a selected document is highlighted, and a print setting button 1904 which is disabled in FIG. 19 is enabled.

If the user presses the print setting button 1904, the print setting window shown in FIG. 16 appears. The window in FIG. 16 is the same as that in FIG. 28, but does not display the "delete after print" button 2802 which is displayed in FIG. 28, in order to implement the above-mentioned function 2 "print document in medium" (inhibiting deletion of a document in the storage).

(6) Logical Transition 2512

If the user presses a print start button 1601 in the window shown in FIG. 16, the window shifts to the window display in FIG. 17 representing that printing is in progress.

(7) Logical Window 2504

The logical window 2504 is a window as shown in FIG. 17 representing that printing is underway.

(8) Logical Transition 2513

Upon completion of printing in the window display of FIG. 17, the window returns to one shown in FIG. 19 via the logical transition 2513.

As described above, for package B (Media Print), the document list display, and a window displayed upon completion of printing are basically the same as those for package A (Storage Print). However, some of buttons displayed in the window or display contents are different from those for package A. In this fashion, for example, it is possible to inhibit deletion of a document in the medium in "print document in medium".

[Description of Window Transition Upon Selecting Package C (Copy)]

(1) Logical Window 2501

The logical window 2501 corresponds the display of a menu window as shown in FIG. 4.

(2) Logical Transition 2516

The logical transition 2510 is a transition upon selecting the button 4007 (copy) in the menu window.

(3) Logical Window 2522

A copy setting window as shown in FIG. 21 appears. In the window of FIG. 21, the user makes copy settings such as the number of copies.

(4) Logical Transition 2517

The logical transition 2517 is a transition upon pressing a start key 314 of a console unit 112 in the copy setting window shown in FIG. 21. Then, the copy operation starts.

(5) Logical Window 2523

The logical window 2503 is a window shown in FIG. 22 representing that copying is in progress.

(6) Logical Transition 2518

Upon completion of copying in FIG. 22, the display returns to the display (logical window 2522) in FIG. 21.

<Description of Operation in Second Embodiment>

An operation in the second embodiment will also be explained with reference to the flowchart of FIG. 23.

The operation in FIG. 23 will be explained as that of a window procedure upon launching it in the second embodiment of the present invention.

In step S1, the window procedure reads out specification data set in a currently displayed window and specification data of a window corresponding to the category of each package and obtains difference specification data representing the difference between them. Then, the window procedure sets a default specification into the operation specification. At this time, the operation specification becomes Disp="delete BTN", which means that the default specification designates displaying the delete button 2703.

The process advances to step S2 to acquire the category (see FIG. 11) of a package of an application which has launched the window procedure. In this case, the category is "print document" or "print document in medium". Assume that the category acquired in step S2 is "print document". The process advances to step S3 to determine whether difference specification data corresponding to the category acquired in step S2 exists in the difference specification data read out in step S1. If no corresponding difference specification data exists, the process advances to step S4 to execute window display processing in accordance with the default operation specification set in step S1. More specifically, the window procedure executes the operation specification Disp="delete BTN", displaying the delete button 2703 corresponding to "delete BTN" in the window.

If it is determined in step S3 that difference specification data (for example, inhibiting deletion of a document in the medium in "print document in medium") corresponding to the category acquired in step S2 exists in the difference specification data read out in step S1, the process advances to step S5 to read a difference specification data which matches the category. The operation specification set as a default in step S1 is rewritten into the difference specification data. In this case, the delete button 2703 corresponding to "delete BTN" is hidden. Then, the process advances to step S4 to display the window (FIG. 19) in accordance with the rewritten operation specification.

As described above, according to the second embodiment, while a common window is displayed, part of the display can be changed to implement a function corresponding to each package (application).

[Appendix: Description of Difference Specification Data]

A concrete example of acquiring the above-mentioned difference specification data will be explained.

<Definition of Difference Specifications (FIG. 13)>

A case where difference specification data of the window shown in FIG. 13 corresponding to the logical window 1102 for selecting a stored document is extracted will be exemplified. In this example, the definition is described in the C language. As described above, the difference specification data defines a change of the transition from a logical window in accordance with the category of an executed package, as shown in FIG. 10.

```
define MAX_DEF_SPEC_SIZE 10000 define TMP 0 define OK 0 define NG -1 char currentDifSpec[MAX_DEF_SPEC_SIZE];

...

SpecDifferentialTable(currentDifSpec,

MAX_DEF_SPEC_SIZE, TMP, 0);
```

In accordance with this definition, the window procedure invokes SpecDifferentialTable. The window procedure is a program which is executed by a CPU 101 to control the display on a display 313 of the console unit 112 in correspondence with the logical window in FIG. 10. SpecDifferentialTable stores difference specification data of a currently displayed window (TMP) in currentDifSpec[ ], and returns a reply. In currentDifSpec[ ], (0) to "MAX_DEF_SPEC_SIZE" are stored as a NULL-terminated character string in the difference specification from the top.

If difference specification data to be stored falls within "MAX_DEF_SPEC_SIZE", SpecDifferentialTable returns OK. If difference specification data to be stored exceeds "MAX_DEF_SPEC_SIZE", SpecDifferentialTable returns NG. If the window procedure receives NG, it requests data continued from previously received one until it receives OK.

In the embodiment, the invoked currentDifSpec[ ] stores

[default,NULL]+["Media Print",<STS=DlgOpen,
 SetVal=(StorageRepository=USB)+
 Open="document list display window">]　　example (1)

The basic format of the difference specification data is ([default, specification]+[package ID, difference specification]+ . . . ). [ ] is a difference specification data unit for each package. The first [ ] always holds ([default, NULL]). "STS=DlgOpen" represents that the status is starting-up of the window procedure. After this, a difference in specification data is described if the package which currently controls the display on the display 313 has a difference specification. A package name parenthesized in " " represents the ID. The notation of difference specifications describes one difference specification in < >. One difference specification is formed from a trigger and operation specification. The operation specification is described by an operation instruction and its object:

operation specification 1=(operation instruction 1=object 1)

When a plurality of operation instructions are set for one trigger, they are linked with "+". When a plurality of difference specifications are set for one package, < > are repetitively linked with "+":

difference specifications = < trigger 1, operation specification 1*a* + operation specification 1*b* + ... + operation specification *n* > + < trigger 2, operation specification 2 > ··· + < trigger *n*, operation specification *n* >

There are the following types of triggers:
status (STS)
press button (BTN)
where each ( ) represents a notation.

There are the following types of operation instructions:
transition (Open)
display (Dips)
hide (Hyde)
enable (Enable)
disable (Disable)
set (SetVal)
where each ( ) represents a notation.

An object corresponding to each operation designates the object ID of the operation. The relationship between operations and objects is

| [Operation] | [Object] |
|---|---|
| transition | window |
| display | messages, bitmaps, buttons |
| hide | messages, bitmaps, buttons |
| enable | buttons |
| disable | buttons |
| set | internal setting variables |

An object name parenthesized in " " represents its ID.

In the embodiment, the application "print document in storage" is launched and starts displaying the window shown in FIG. 13 for selecting the storage of a document. In practice, however, the USB is selected as the storage to display a document list window as shown in FIG. 19 without displaying the window in FIG. 13. A difference specification describing this operation is difference specification data in example (1) described above.

In example (1), [default, NULL] represents a default specification. The subsequent "print document in medium" describes the category of the package. "SetVal=(StorageRepository=USB)+Open="document list display window" indicates displaying a list of documents in the USB memory.

In a case that there is no difference specification, SpecDifferentialTable returns "NULL" to currentDifSpec. For example, this corresponds a case where the windows in FIGS. 14, 15, 19, and 20 corresponding to the logical window 1103 are displayed. As described in the example of the window transition for package B, there is no difference, so SpecDifferentialTable returns "NULL" to currentDifSpec. This is because the difference between the storage location name display areas 1403 and 1903, that between the storage location icons 1402 and 1902, and that between document list displays are merely displays corresponding to respective selections. That is, the operation of the program which displays these windows is the same, and need not be described as difference specification data.

<Definition of Difference Specifications (FIG. 17)>

A case where difference specification data of the window shown in FIG. 17 which corresponds the logical window 1104 and represents that printing is in progress is extracted will be exemplified. The notation, definition, and the like of difference specification data are the same as those described above.

While the window shown in FIG. 17 is displayed, the following program is invoked:
SpecDifferentialTable(currentDifSpec, MAX_DEF_SPEC_SIZE, TMP, 0);
The invoked currentDifSpec[ ] stores

[default,NULL]+["print document in storage",
 <STS=PrintComp,Open="deletion check win-
 dow">]+["print document in medium",
 <STS=PrintComp,Open="print document in
 medium">]　　example (2)

In the embodiment, a window (corresponding to the logical window 1104) representing that printing is in progress is common to both the categories "print document" and "print document in medium", as shown in FIG. 17. However, the logical window changed upon generation of a print job completion status is different, as shown in the transition view of FIG. 10. A difference specification describing this operation is the above described difference specification data.

More specifically, [<STS=PrintComp, Open="deletion check window">] indicates that the display changes to the deletion check window shown in FIG. 18 upon completion of printing a document in the storage. ["print document in medium", <STS=PrintComp, Open="print document in medium">] indicates that the display changes to the medium document list display window shown in FIG. 19 upon completion of printing a document in the medium.

The relationship with the flowchart in FIG. 23 will be explained based on this premise.

In step S1, SpecDifferentialTable is invoked to read a default difference specification into the operation specification. In this case, the operation specification becomes NULL, which indicates that the default difference specification has not changed. In step S2, the ID of a running application is acquired. In step S3, it is determined whether the same ID as the package ID acquired in step S2 exists in the difference specification data read in step S1. For example, in the above-mentioned example (1), "Storage Print" does not exist, so the process advances to step S4, and the window procedure executes the operation specification (unchanged). As a result, the window procedure is activated to take an initial state.

If the ID of the package which has activated the window procedure is "Media Print", "Media Print" exists in the difference specification data in example (1) in step S3, so the process advances to step S5. More specifically, ["Media Print", <STS=DlgOpen, SetVal=(StorageRepository=USB)+Open="document list display window">] is detected in the difference specification data. For this reason, the process advances to step S5 to rewrite the operation specification into (SetVal=(StorageRepository=USB)÷Open="document list display window"). Thereafter, the process advances to step S4 to execute the operation specification. In this case, in step S4, the window procedure sets "USE" in the setting value StorageRepository, and displays a window (FIG. 19) whose ID is "document list display window".

Next, the correspondence with FIG. 24 will be explained.

In step S11, SpecDifferentialTable is invoked to read a default difference specification into the operation specification. In this case, the operation specification becomes Open="deletion check window". Then, the process advances to step S12 to acquire the package of an application which has launched the window procedure. In this case, the package is "Storage Print" or "Media Print". Assume that the package is "Storage Print". In step S13, it is determined whether the package acquired in step S12 exists in the difference specification data read in step S11. Since "Storage Print" does not exist, the process advances to step S14, and the window procedure executes the operation specification Open="deletion check window". In response to this, the display changes to the "deletion check window" shown in FIG. 18

In step S13, assume that the package "Media Print" acquired in step S12 exists in the difference specification data read in step S11, like the above-described example (2). In this case, ["print document in medium", <STS=PrintComp, Open="print document in medium">] can be detected in the difference specification data. Hence, the process advances from step S13 to step S15 to rewrite the operation specification Open="deletion check window" into Open="print document in medium". Then, the process advances to step S14 to execute the operation specification. The display changes to the "print document in medium" window as shown in FIG. 19.

As described above, according to the first embodiment, even when the same state occurs during execution of an application, the procedure can shift to different processing in accordance with the category of the running application.

<Definition of Difference Specifications (Second Embodiment)>

A case where difference specification data between the print setting windows in FIGS. 14 and 26 corresponding to the logical window 2503 is extracted will be exemplified. The notation and the definition based on the C language are the same as those described above, and a detailed description thereof will not be repeated.

SpecDifferentialTable(currentDifSpec, MAX_DEF_SPEC_SIZE, TMP, 0);

The invoked currentDifSpec[ ] stores

[default,<STS=DlgOpen,Disp="delete BTN">]+
 ["print document in medium",<STS=DlgOpen,
 Hyde="delete BTN">]

In this case, "delete BTN" is the ID of a button corresponding to the delete button 2703, and Hyde="delete BTN" indicates that the delete button 2703 is hidden. That is, it is set not to display the delete button 2703 upon starting the window procedure in "Media Print".

<Description of Concrete Operation in Second Embodiment>

FIG. 23 is a flowchart explaining the operation of the window procedure upon receiving the status DlgOpen (activation of the window procedure) according to the second embodiment. A concrete operation in FIG. 25 will be explained with reference to FIG. 23.

Upon receiving DlgOpen, the window procedure starts executing the sequence. In step S1, the window procedure invokes SpecDifferentialTable to read a default difference specification to set the operation specification. The operation specification becomes Disp="delete BTN". The process advances to step S2, and the window procedure acquires a package which has launched it. At this time, the package is "Storage Print" or "Media Print". Assume that the package ID="Storage Print". In step S3, the window procedure determines whether the acquired package exists in the read difference specification data. Since "Storage Print" does not exist, the process advances to step S4, and the window procedure executes the operation specification Disp="delete BTN". In response to this, the window procedure displays, in the window, the delete button 2703 whose ID is "delete BTN".

If the ID of the package which has activated the window procedure is "Media Print" in step S3, ["print document in medium", <STS=DlgOpen, Hyde ="delete BTN">] can be detected in the difference specification data. Thus, the process advances to step S5 to rewrite the operation specification Disp "delete BTN" into Hyde="delete BTN". Thereafter, the process advances to step S4 to execute the operation specification. The window procedure hides the delete button 2703 whose ID is "delete BTN" (FIG. 19).

Figure 29:
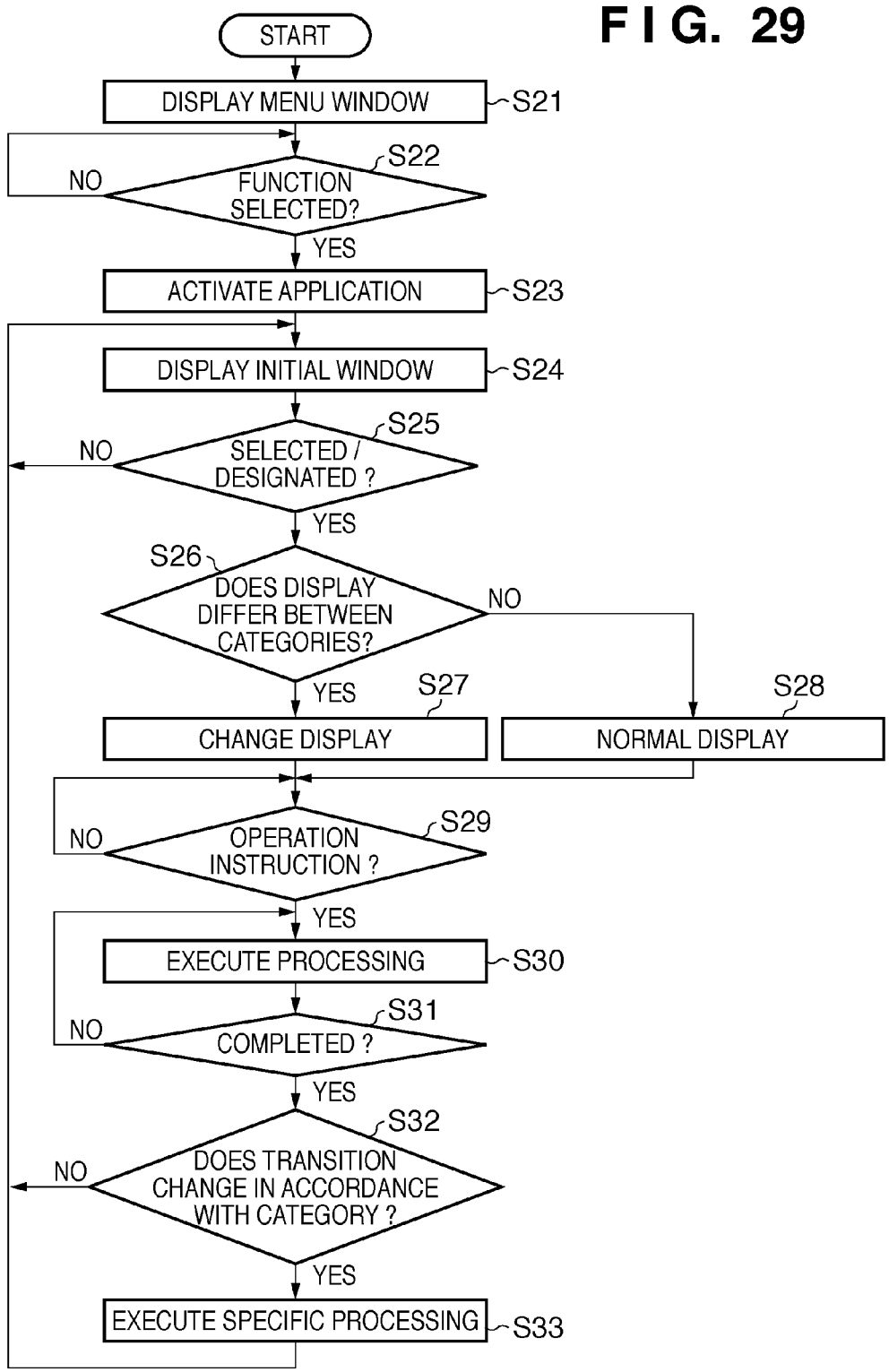
FIG. 29 is a flowchart explaining processes according to the first and second embodiments.

FIG. 29 is a flowchart explaining at once the processes according to the first and second embodiments of the present invention. This flowchart will be explained based on the above-described concrete examples according to the first and second embodiments. A program for executing this processing is installed in the HDD 104, in execution, loaded into the RAM 102, and executed under the control of the CPU 101.

In step S21, the display 313 of the console unit 112 displays a menu window as shown in FIG. 4. In step S22, if the user designates a button in the menu window and execution of the function, the process advances to step S23 to refer to a category associated with the package, acquire an application associated with the category, and launch the application. The association between the function and the category and that between the category and the application can be obtained by looking up the above-described tables shown in FIGS. 11 and 12.

The process advances to step S24 to display an initial window based on the application. The initial window is the window shown in FIG. 13 for the application "print document in storage" and one shown in FIG. 21 for the application "copy". In step S25, selection of a document, setting of copy specifications, and the like are performed based on the window. Upon completion of the setting, the process advances to step S26 to determine, based on the category of the function selected in step S22, whether there is a difference (difference specification) in user interface window display. If there is a difference, the process advances to step S27 to change the display contents in accordance with the category. If there is no difference, the process advances to step S28 to display a normal user interface window.

For example, for "print document" (Storage Print), a user interface window including the delete button 2703 which instructs deletion of a selected document after printing it is displayed as shown in FIG. 27. To the contrary, for "print document in medium" (Media Print), a user interface window including no delete button which instructs deletion of a selected document after printing it is displayed as shown in FIG. 20. It is determined in accordance with whether the category is "print document" of "print document in medium" whether or not to display a user interface window including the "delete after print" button 2802, as shown in FIG. 16 or 28.

Then, the process advances to step S29 to wait for input of an instruction such as a print instruction, send instruction, or copy instruction. Upon receiving an instruction, the process advances to step S30 to execute the processing. If the processing is completed in step S31, the process advances to step S32. In step S32, it is determined based on the category of the function selected in step S22 whether a user interface window to be displayed next differs from the current one. If YES in step S32, the process advances to step S33 to execute different processing. If NO in step S32, the window shifts to a completion window corresponding to the function.

This corresponds the following display control. For example, when printing is completed during execution of an application whose category is "print document", the window shifts to a print completion window as shown in FIG. 18 to inquire of the user whether to delete the printed document. To the contrary, when printing is completed during execution of an application whose category is "print document in medium", the window returns to one in FIG. 19 without displaying one shown in FIG. 18, in order to prevent deletion of the document in the medium.

The processing in step S26 and that in step S23 correspond to the following display control. More specifically, the processing in step S26 corresponds to a case where an application launched in step S23 is associated with a plurality of categories. It is determined whether it is necessary to permit or inhibit predetermined processing in accordance with a category associated with a designated function in the user interface window. The processing in step S32 corresponds to a case where an application launched in step S23 is associated with a plurality of categories. It is determined whether to display a predetermined user interface window or skip the display after executing the processing in accordance with a category associated with a designated function in the user interface window.

The MFP according to the embodiments includes a plurality of types of functions. The MFP is configured to execute, under processing conditions set via a user interface (console unit 112), a function selected by the user from these functions via the user interface. At least two types of functions among a plurality of types of functions include a setting item of the same attribute (same category). A common window which can be shared between these functions can be provided as a common user interface on the console unit 112, as described above. As the common user interface, the embodiments have exemplified a plurality of types of common user interfaces. However, it suffices to provide at least one common user interface.

For example, a function which has the same processing conditions as those that can be set for a function of printing data stored in the HDD 104 is a function of printing data stored in a removable medium connected to the USB I/F 196. These functions include setting items for setting processing conditions as so-called print conditions including the number of copies, print layout, print density, copy ratio, print paper for use, and finishing. As a user interface available when setting these print conditions, there is provided at least one common user interface which can be shared (common) between these functions. It is also possible to support only one (one type of) common user interface. Even in this configuration, it is desirable to execute the same control as that implemented by the controller unit 100.

For example, prior to displaying a common user interface, it is determined which of the two functions, that is, two types of functions subjected to display of the common user interface (to be referred to as a common UI hereinafter) is designated (selected) by the user. The embodiments have exemplified a configuration in which the controller unit 100 makes this determination. However, the present invention is not limited to this. For example, a determination unit which specifies a function, in accordance with which the user interface changes (a function which accesses the user interface) immediately before displaying a common UI may also be arranged separately from the controller unit 100.

When displaying the common UI, the display contents of the common UI are controlled to reflect the determination result. For example, when it is determined that one of the two types of functions is selected, it is controlled to enable, in the common UI, setting items (print conditions in this example) common to the selected function and the other function. In a case that processing conditions regarding the setting items are accepted via the common UI, they are regarded as processing conditions for the selected function, and the MFP is controlled to operate in accordance with the processing conditions for the selected function. This common UI is controlled to disable (hide, gray out, or hatch) setting items, acceptance of which is permitted for the other function and inhibited for the selected function. In this manner, it is controlled to permit acceptance of the processing conditions of common setting items from a common UI, and inhibit (limit) acceptance of the processing conditions of setting items which can be accepted for only the other function.

In the embodiments, as described above, the controller unit 100 implements the control of limiting the display contents of a common UI on the basis of the result of determination of a function, in accordance with which the UI shifts to a common one. However, the embodiments are not limited to this. In the above-described embodiments, it is controlled which window is to be displayed immediately after displaying the common UI, in addition to the control of the display contents of the common UI. That is, as described above, the controller unit 100 implements the control (shift destination control) of a transition destination window to which the common UI changes. However, even the shift destination control is not limited to this configuration. For example, a controller which controls the shift destination may also be arranged independently of a controller which limits the display contents of the above-mentioned common UI on the basis of a selected function. Even in this case, it is desirable to use the result of determining (specifying) a selected function, as described above. When one function described above is selected, display of a common UI ends, and the other function is selected soon, it is controlled not to display an unshared UI immediately after the common UI. In this fashion, it is controlled in accordance with the next selected function to skip display of a window corresponding to the other function as a display immediately after a common UI. It is controlled to display an unshared UI which is to be displayed after the skipped window, and to accept the settings of processing conditions regarding one function. The shift destination is preferably always controlled regardless of whether it is achieved by a single controller or another controller.

As described at the beginning, the embodiments are also applicable to an electronic device other than the MFP. For example, the embodiments are applicable to even an information processing apparatus which has an application for executing a plurality of types of functions and can execute a function designated by the user. As described at the beginning, the device may also be an image forming apparatus (printing apparatus) such as an MFP, or a cell phone having a telephone function and e-mail function. The device may also be a digital camera having a function of transmitting photo data captured by a camera to a computer, and a function of transmitting photo data stored in a memory card to the computer. The device may also be an information terminal such as a host computer or server computer having the data communication function, e-mail function, and the like. In this way, the embodiments are applicable to various kinds of devices including various data communication apparatus having a plurality of types of functions, an image input device (e.g., a PC or scanner), and an image capturing device (e.g., a camera). Needless to say, the embodiments need not be applied to all the devices. For example, it suffices to apply the embodiments to at least one of the devices.

(Other Embodiments)

The embodiments of the present invention have been described in detail. The present invention may be applied to a system including a plurality of devices or an apparatus formed by a single device.

The present invention is also achieved by supplying a software program for implementing the functions of the above-described embodiments to a system or apparatus directly or from a remote place, and reading out and executing the supplied program by the computer of the system or apparatus. In this case, the form of the present invention is not limited to the program as long as a program function is attained.

The present invention is therefore implemented by program codes installed in the computer in order to implement functional processing of the present invention by the computer. That is, the appended claims of the present invention also incorporate a computer program for implementing functional processing of the present invention. In this case, the program may take the form of an object code, a program executed by an interpreter, script data supplied to the OS, or the like as long as the functions of the program can be provided.

As a computer-readable storage medium for supplying the program, various storage media are available, including a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can also be supplied by connecting a client computer to an Internet homepage via the browser of the client computer, and downloading the program from the homepage to a storage medium such as a hard disk. In this case, the downloaded program may be the computer program of the present invention or a compressed file containing an automatic installing function. The program can also be implemented by grouping program codes which form the program of the present invention into a plurality of files, and downloading the files from different homepages. That is, the appended claims of the present invention also incorporate a WWW server which allows a plurality of users to download the program files for implementing functional processing of the present invention by a computer.

The program of the present invention may be encrypted, stored in a storage medium such as a CD-ROM, and distributed to a user. A user who satisfies predetermined conditions is prompted to download decryption key information from a homepage via the Internet. The user installs the encrypted program in the computer so as to be able to execute it by using the key information.

The functions of the above-described embodiments are also implemented in a form other than one in which the computer executes the readout program. For example, the functions of the above-described embodiments can be implemented when an OS or the like running on the computer performs part or all of actual processing on the basis of the instructions of the program.

The program read out from the storage medium may be written in the memory of a function expansion board inserted into the computer or the memory of a function expansion unit connected to the computer. In this case, the CPU of the function expansion board or function expansion unit performs part or all of actual processing on the basis of the instructions of the program, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-039095, filed Feb. 20, 2008, which is hereby incorporated by reference herein in its entirety.

The invention claimed is:

1. An information processing apparatus being capable of executing first and second functions that include common processing, and setting a processing condition of each function by using a user interface, the apparatus comprising:
   a selection unit configured to select any one of the first and second functions;
   a display control unit configured to, in a case that the selection unit selects any one of the first and second functions, display a user interface window common to the first and second functions;
   a setting unit configured to set a processing condition of the function selected by the selection unit, using the user interface window; and
   a control unit configured to, in a case that the selection unit selects the first function, display a user interface window in which a designation of specific processing being accompanied with the common processing included in the first function is enabled, and configured to, in a case that the selection unit selects the second function, not display the user interface window in which the designation of the specific processing being accompanied with the common processing included in the second function is enabled.

2. The apparatus according to claim 1, wherein the control unit enables the designation of the specific processing by displaying a button corresponding to the specific processing.

3. The apparatus according to claim 1, further comprising a storage unit configured to store the first function, the second function, and an application in association with each other.

4. The apparatus according to claim 1, wherein the first function is a function of printing a document stored in a memory of the information processing apparatus, and the second function is a function of printing a document stored in a removal memory connected to the information processing apparatus.

5. The apparatus according to claim 1, wherein the user interface window common to both the first and second functions is a user interface window for printing of a stored document.

6. An information processing apparatus being capable of executing first and second functions that include common processing, and setting a processing condition of each function by using a user interface, the apparatus comprising:
- a selection unit configured to select any one of the first and second functions;
- a display control unit configured to, in a case that the selection unit selects any one of the first and second functions, display a user interface window common to the first and second functions;
- a setting unit configured to set a processing condition of the function selected by the selection unit, using the user interface window; and
- a control unit configured to, in a case that the selection unit selects the first function, display a specific window being accompanied with the common processing included in the first function after the user interface window is displayed, and configured to, in a case that the selection unit selects the second function, not display the specific window being accompanied with the common processing included in the second function after the user interface window is displayed.

7. The apparatus according to claim 6, wherein the specific window is displayed after the first function has been executed.

8. A control method of an information processing apparatus being capable of executing first and second functions that include common processing, and setting a processing condition of each function by using a user interface, the method comprising:
- a selection step of selecting any one of the first and second functions;
- a display control step of, in a case that any one of the first and second functions is selected in the selection step, displaying a user interface window common to the first and second functions;
- a setting step of setting a processing condition of the function selected in the selection step, using the user interface window; and
- a control step of, in a case that the first function is selected in the selection step, displaying a user interface window in which a designation of specific processing being accompanied with the common processing included in the first function is enabled, and, in a case that the second function is selected in the selection step, not displaying the user interface window in which the designation of the specific processing being accompanied with the common processing included in the second function is enabled.

9. The method according to claim 8, wherein the control step enables the designation of the specific processing.

10. The method according to claim 8, further comprising a storage step of storing the first function, the second function, and an application in association with each other.

11. The method according to claim 8, wherein the first function is a function of printing a document stored in a memory of the information processing apparatus, and the second function is a function of printing a document stored in a removal memory connected to the information processing apparatus.

12. The method according to claim 8, wherein the user interface window common to both the first and second functions is a user interface window for printing of a stored document.

13. A computer-readable storage medium storing a program for causing a computer to execute a control method defined in claim 8.

14. A control method of an information processing apparatus being capable of executing first and second functions that include common processing, and setting a processing condition of each function by using a user interface, the method comprising:
- a selection step of selecting any one of the first and second functions;
- a display control step of, in a case that any one of the first and second functions is selected in the selection step, displaying a user interface window common to the first and second functions;
- a setting step of setting a processing condition of the function selected in the selection step, using the user interface window; and
- a control step of, in a case that the first function is selected in the section step, displaying a specific window being accompanied with the common processing included in the first function after the user interface window is displayed, and, in a case that the second function is selected in the selection step, not displaying the specific window being accompanied with the common processing included in the second function after the user interface window is displayed.

15. The method according to claim 14, wherein in the control step the specific window is displayed after the first function has been executed.

16. A computer-readable storage medium storing a program for causing a computer to execute a control method defined in claim 14.

* * * * *